US012566356B2

(12) United States Patent
Iwasaki et al.

(10) Patent No.: US 12,566,356 B2
(45) Date of Patent: Mar. 3, 2026

(54) ADJUSTABLE DIAPHRAGM, CAMERA MODULE, AND ELECTRONIC DEVICE

(71) Applicant: AAC Optics Solutions Pte. Ltd., Singapore City (SG)

(72) Inventors: Takashi Iwasaki, Osaka (JP); Kazuo Shikama, Osaka (JP)

(73) Assignee: AAC Optics Solutions Pte. Ltd., Singapore City (SG)

( * ) Notice: Subject to any disclaimer, the term of this patent is extended or adjusted under 35 U.S.C. 154(b) by 126 days.

(21) Appl. No.: 18/393,594

(22) Filed: Dec. 21, 2023

(65) Prior Publication Data

US 2025/0093743 A1      Mar. 20, 2025

(30) Foreign Application Priority Data

Sep. 20, 2023      (JP) ................................. 2023-151828

(51) Int. Cl.
G03B 9/06 (2021.01)
G03B 17/12 (2021.01)

(52) U.S. Cl.
CPC ............... G03B 9/06 (2013.01); *G03B 17/12* (2013.01)

(58) Field of Classification Search
CPC ................................. G03B 9/06; G03B 30/00
See application file for complete search history.

(56) References Cited

U.S. PATENT DOCUMENTS

| | | | | |
|---|---|---|---|---|
| 4,588,276 A | * | 5/1986 | Kaise ....................... | G03B 9/06 396/510 |
| 5,926,663 A | * | 7/1999 | Suzuki ..................... | G03B 9/06 396/510 |
| 7,085,032 B2 | * | 8/2006 | Sato ........................ | G03B 21/28 396/510 |
| 7,724,412 B2 | * | 5/2010 | Powell ................... | G02B 5/005 359/227 |

* cited by examiner

*Primary Examiner* — Leon W Rhodes, Jr.
(74) *Attorney, Agent, or Firm* — Wiersch Law Group

(57) ABSTRACT

An adjustable diaphragm is disclosed. At least one light-shielding blade is movably fixed through cooperation of a blade supporting ring and a blade driving ring, an electromagnetic driving assembly drives, by using Lorentz force between driving magnet and a driving coil, a driving rod to rotate relative to a base, and the driving rod is slidably connected to the blade driving ring, to drive the blade driving ring to rotate, thereby driving, by using the blade driving ring, the light-shielding blade to rotate to block or expose a lens of a camera module. In this way, a diaphragm part and the electromagnetic driving assembly are separated from the lens, a counterweight of the camera module can be optimized, and a burden on an autofocus mechanism is reduced. In the present disclosure, a camera module and an electronic device are further disclosed.

19 Claims, 23 Drawing Sheets

ADJUSTABLE DIAPHRAGM, CAMERA MODULE, AND ELECTRONIC DEVICE

CROSS REFERENCE TO RELATED APPLICATIONS

This application claims priority to Japanese Patent Application No. 2023-151828, filed on Sep. 20, 2023, which is incorporated by reference herein in its entirety.

TECHNICAL FIELD

Embodiments of the present disclosure relate to the field of camera apparatus technologies, and in particular, to an adjustable diaphragm, a camera module, and an electronic device.

BACKGROUND

An aperture (adjustable diaphragm) is used for changing an amount of light entering an optical system to participate in imaging. The aperture is arranged in a camera module, and the camera module can be adapted to shooting needs of different light and dark scenes by adjusting a size of the aperture. A focus mechanism can implement focusing of the camera module by changing a position of a lens, so that the camera module can shoot a target object more clearly. Shooting performance of the camera module can be improved through cooperation between the aperture and the focus mechanism. Therefore, a camera module with an aperture and a focus mechanism is used in an electronic device, such as a smart phone or a tablet computer, and gains favor among consumers.

A blade driving mechanism drives a plurality of blades to move, to change a size of an opening enclosed by these blades, which can be used in a different optical unit such as a shutter, an aperture, or a light filter on a camera. An existing adjustable diaphragm, and a corresponding driving mechanism, are arranged on a lens and are located on an object side of the lens. In this way, an object side counterweight of the lens is increased, easily causing the lens to tilt and affecting focusing driving of the lens. If a leaf spring is used, hardness of the leaf spring needs to be increased to support the lens with the adjustable diaphragm. Even if the leaf spring is not used, the same large holding force needs to be provided to the focus mechanism. In addition, electrical wiring needs to be arranged inside to drive the adjustable diaphragm, and it is necessary to ensure that the electrical wiring does not affect focusing, which makes a design of an overall solution difficult.

Therefore, an adjustable diaphragm for resolving the foregoing technical problems is an urgent need in the art.

SUMMARY

An objective of embodiments of the present disclosure is to provide an adjustable diaphragm, which can optimize a counterweight of a camera module and avoid interfering focusing driving of the camera module.

To resolve the foregoing technical problems, the present disclosure provides an adjustable diaphragm, including:

At least one light-shielding blade; a blade supporting ring, where the at least one light-shielding blade is rotatably fixed on the blade supporting ring; a blade driving ring, coaxial with the blade supporting ring and fixed on an object side of the blade supporting ring, where the blade driving ring is rotatable relative to the blade supporting ring; and the at least one light-shielding blade is slidably connected to the blade driving ring; and an electromagnetic driving assembly, including a base, a driving magnet, a driving rod, and a driving coil, where the driving magnet is fixed on the base, the driving rod is rotatably fixed on the base, and the driving coil is fixed on the driving rod and is arranged relative to the driving magnet; the driving rod is movably connected to the blade driving ring; and the driving magnet drives, when the driving coil is energized, the driving coil to drive the driving rod to rotate, and the driving rod drives the blade driving ring to rotate to drive the at least one light-shielding blade to block or expose a lens of a camera module.

In some embodiments, the driving magnet includes a first sub-magnet and a second sub-magnet. The first sub-magnet and the second sub-magnet are arranged at an angular interval, and polarities of magnetic poles that are of the first sub-magnet and the second sub-magnet and are adjacent to the blade supporting ring are different. The driving coil, when energized, is subjected to force in a same direction in a magnetic field of the first sub-magnet and a magnetic field of the second sub-magnet to drive the driving rod to rotate.

In some embodiments, the driving rod includes a mounting portion and two driving arm fixedly connected to the mounting portion. The mounting portion is rotatably fixed on the base, and the driving coil is fixed on the mounting portion. The two driving arms are arranged at intervals and form a driving slot. The blade driving ring includes a driving ring portion and a driving shaft fixedly connected to the driving ring portion, and the driving shaft slidably extends into the driving slot.

In some embodiments, a position detection element arranged on the mounting portion is further included. The position detection element detects a rotation angle of the blade driving ring by detecting a relative position of the driving magnet.

In some embodiments, a flexible printed circuit fixed on the mounting portion and located between the mounting portion and the driving coil is further included. The flexible printed circuit is electrically connected to the driving coil and the position detection element.

In some embodiments, the blade supporting ring includes a supporting ring portion and a side wall extending from the supporting ring portion to the blade driving ring. The side wall extends along a circumferential direction of the supporting ring portion; the side wall has a circular arc-shaped notch; and the driving ring includes a driving ring portion and a driving shaft fixedly connected to the driving ring portion, the driving ring portion is accommodated in a space enclosed by the side wall and is arranged relative to the supporting ring portion, and the driving shaft extends to a periphery of the side wall through the circular arc-shaped notch and is bent and extends toward the two driving arms.

In some embodiments, an arc-shaped positioning member arranged in the space enclosed by the side wall and located on a side of the driving ring portion facing away from the supporting ring portion is further included. The arc-shaped positioning member is configured to fix the driving ring portion in an axial direction of the driving ring portion.

In some embodiments, a positioning slot extending circumferentially is provided on an inner wall surface of the side wall, and the arc-shaped positioning member is partially embedded in the positioning slot.

In some embodiments, a closed magnet yoke arranged on the mounting portion and configured to form a closed magnetic field with the driving magnet is further included.

In some embodiments, side walls that are of the two driving arms and are opposite to each other are both arranged as circular arc side walls protruding outward, and the driving shaft is cylindrical.

According to the adjustable diaphragm provided in the present disclosure, the at least one light-shielding blade is movably fixed through cooperation of the blade supporting ring and the blade driving ring, the electromagnetic driving assembly drives, by using Lorentz force between the driving magnet and the driving coil, the driving rod to rotate relative to the base, and the driving rod is slidably connected to the blade driving ring, to drive the blade driving ring to rotate, thereby driving, by using the blade driving ring, the light-shielding blade to rotate to block or expose the lens of the camera module. In this way, a diaphragm part and the electromagnetic driving assembly are separated from the lens, a counterweight of the camera module can be optimized, and a burden on an autofocus mechanism is reduced. In addition, due to overall independent arrangement, electrical wiring of the electromagnetic driving assembly may be arranged on a periphery of the lens without affecting focusing movement of the lens.

BRIEF DESCRIPTION OF THE DRAWINGS

One or more embodiments are exemplarily described with reference to the corresponding figures in the accompanying drawings, and the descriptions are not to be construed as limiting the embodiments. Elements in the accompanying drawings that have same reference numerals are represented as similar elements, and unless otherwise particularly stated, the figures in the accompanying drawings are not drawn to scale.

DESCRIPTION OF REFERENCE SIGNS

Figure 1:
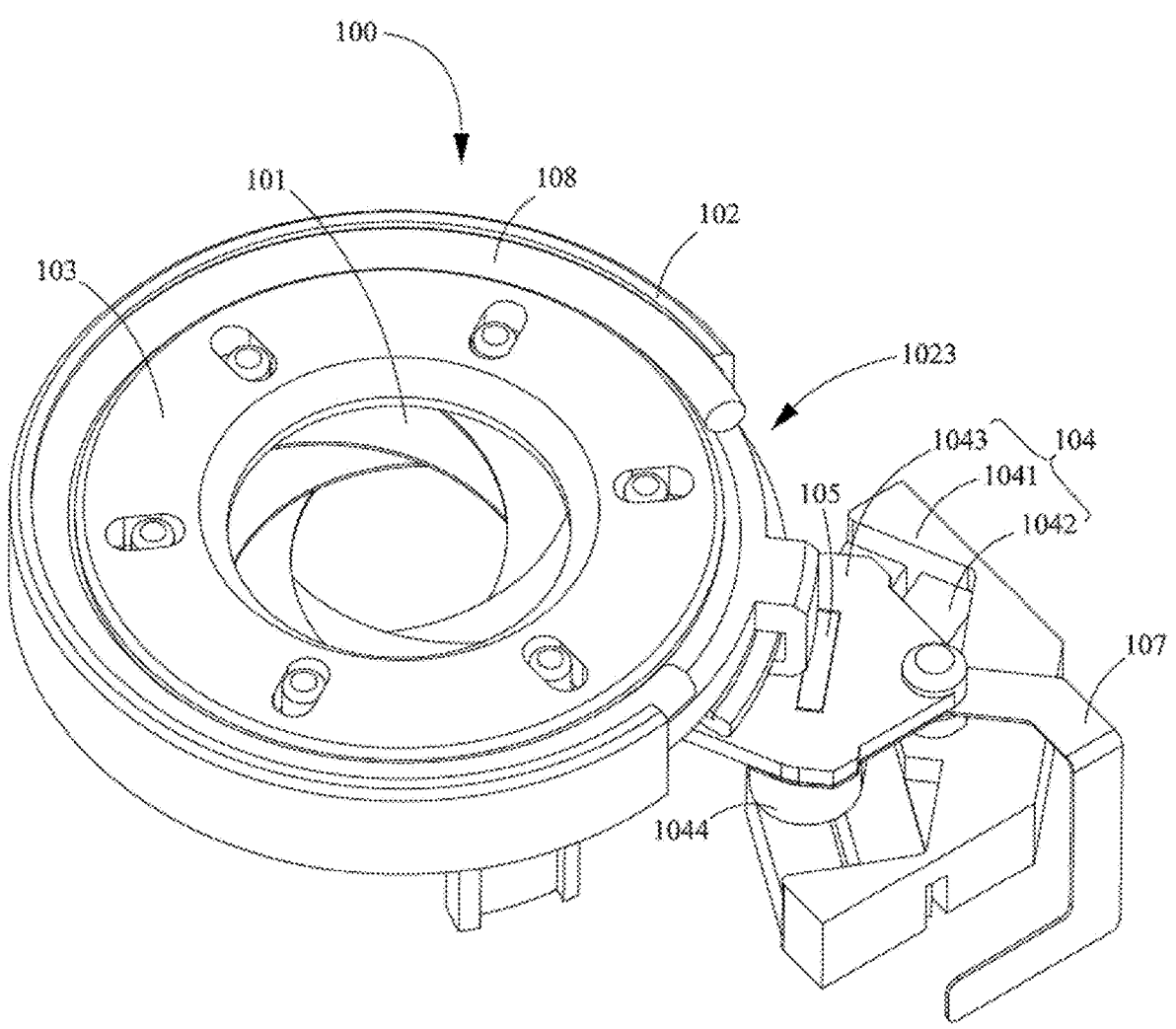
FIG. 1 is a schematic diagram illustrating a three-dimensional structure of an adjustable diaphragm according to a first embodiment of the present disclosure.
Figure 2:
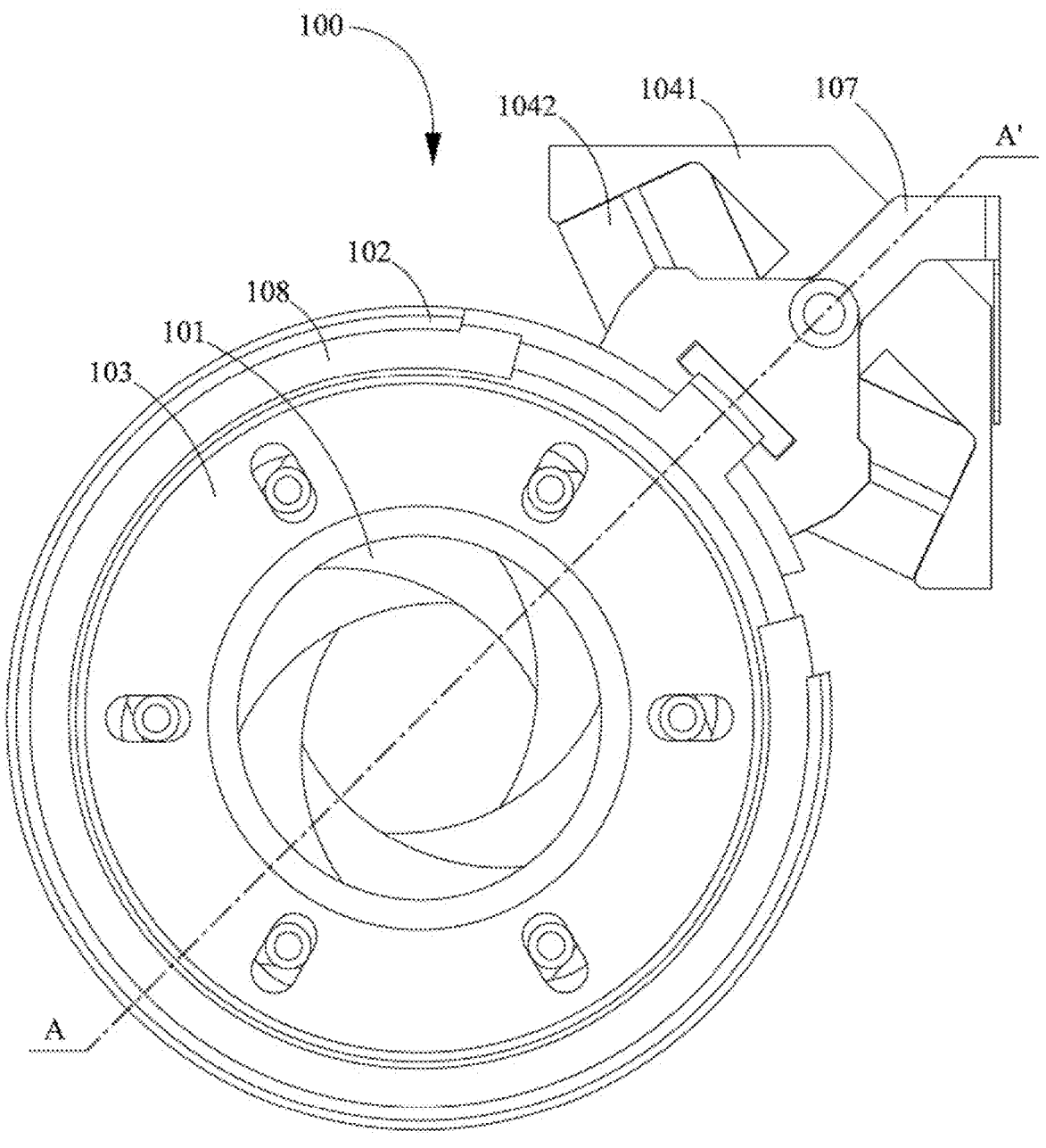
FIG. 2 is a schematic diagram illustrating a front view of the adjustable diaphragm shown in FIG. 1.

| | |
|---|---|
| 100 | adjustable diaphragm |
| 101 | light-shielding blade |
| 1011 | positioning portion |
| 1012 | sliding portion |
| 1013 | light-shielding portion |
| 1013a | circular hole |
| 1014 | connecting shaft |

-continued

| 102 | blade supporting ring |
|---|---|
| 1021 | supporting ring portion |
| 1021a | positioning hole |
| 1022 | side wall |
| 1022a | positioning slot |
| 1023 | circular arc-shaped notch |
| 1024 | supporting leg |
| 103 | blade driving ring |
| 1031 | driving ring portion |
| 1031a | sliding slot |
| 1031b | annular protrusion |
| 1032 | driving shaft |
| 104 | electromagnetic driving assembly |
| 1041 | base |
| 1041a | inclined arm |
| 1042 | driving magnet |
| 1042a | first sub-magnet |
| 1042b | second sub-magnet |
| 1043 | driving rod |
| 1043a | mounting portion |
| 1043b | driving arm |
| 1043c | driving slot |
| 1044 | driving coil |
| 1045 | pivoting shaft |
| 105 | closed magnet yoke |
| 106 | position detection element |
| 107 | flexible printed circuit |
| 1071 | fixed portion |
| 1072 | bent portion |
| 108 | arc-shaped positioning member |
| 200 | camera module |
| 201 | lens |
| 2011 | lens set |
| 2012 | lens shell |
| 202 | autofocus mechanism |
| 2021 | housing |
| 300 | electronic device |
| 301 | device body |

DETAILED DESCRIPTION OF THE EMBODIMENTS

To make objectives, technical solutions, and advantages of embodiments of the present disclosure clearer, the following describes in detail embodiments of the present disclosure with reference to the accompanying drawings. However, a person of ordinary skill in the art should understand that in the embodiments of the present disclosure, many technical details are provided for a reader to better understand the present disclosure. However, the technical solutions as claimed in the present disclosure can also be implemented without these technical details and changes and modifications based on the following implementations.

In the embodiments of the present disclosure, orientations or positional relationships indicated by terms such as "upper", "lower", "left", "right", "front", "rear", "top", "bottom", "inner", "outer", "middle", "vertical", "horizontal", "lateral", and "longitudinal" are based on orientations or positional relationships shown in the accompanying drawings. These terms are mainly intended to better describe the present disclosure and the embodiments of the present disclosure, and are not intended to limit an indicated apparatus, element, or component to a specific orientation, or to be constructed and operated in a specific orientation.

Moreover, some of the foregoing terms may also be used for indicating other meanings in addition to indicating orientations or positional relationships. For example, the term "upper" may also be used for indicating a certain dependence relationship or connection relationship in some cases. A person of ordinary skill in the art can understand specific meanings of these terms in the present disclosure according to a specific case.

In addition, terms "mount", "dispose", "provide", "form", "connect", and "connection" should be understood in a broad sense. For example, the connection may be a fixed connection, a detachable connection, or an integral construction; or the connection may be a mechanical connection or an electrical connection; or the connection may be a direct connection, an indirect connection through an intermediary, or internal communication between two apparatuses, elements, or components. A person of ordinary skill in the art can understand specific meanings of the foregoing terms in the present disclosure according to a specific case.

In addition, terms "first", "second", and the like are mainly intended to distinguish different apparatuses, elements, or components (specific types and structures may be the same or different), and are not intended to indicate or imply relative importance and quantity of indicated apparatuses, elements, or components. Unless otherwise stated, "a plurality of" means two or more than two.

It should be noted that, in the present disclosure, "near end" and "remote end" are relative position concepts. Generally, an end close to a patient is a remote end, and an end close to an operator is a near end. For a transportation device, during use, an end close to a target position is a remote end, and an end close to an operation end is a near end. In addition, "parallel" and "perpendicular" should not be understood narrowly as 0° or 90°, but should be understood as a reasonable angle range including 0° or 90° with fluctuation under the premise of achieving technical effects.

A first embodiment of the present disclosure relates to an adjustable diaphragm 100. As shown in FIG. 1 to FIG. 4, the adjustable diaphragm 100 includes a light-shielding blade 101 and a blade supporting ring 102. The light-shielding blade 101 is rotatably fixed on the blade supporting ring 102. The adjustable diaphragm 100 includes a blade driving ring 103, coaxial with the blade supporting ring 102 and fixed on an object side of the blade supporting ring 102. The blade driving ring 103 is rotatable relative to the blade supporting ring 102, and the light-shielding blade 101 is slidably connected to the blade driving ring 103. The adjustable diaphragm 100 includes an electromagnetic driving assembly 104, including a base 1041, driving magnet 1042, a driving rod 1043 and a driving coil 1044. The driving magnet 1042 is fixed on the base 1041, the driving rod 1043 is rotatably fixed on the base 1041, and the driving coil 1044 is fixed on the driving rod 1043 and is disposed relative to the driving magnet 1042. The driving rod 1043 is movably connected to the blade driving ring 103. The driving magnet 1042 drives, when the driving coil 1044 is energized, the driving coil 1044 to drive the driving rod 1043 to rotate, and the driving rod 1043 drives the blade driving ring 103 to rotate to drive the light-shielding blade 101 to block or expose a lens of a camera module.

According to the adjustable diaphragm 100 provided in the embodiment of the present disclosure, the light-shielding blade 101 is movably fixed through cooperation of the blade supporting ring 102 and the blade driving ring 103, the electromagnetic driving assembly 104 drives, by using Lorentz force between the driving magnet 1042 and the driving coil 1044, the driving rod 1043 to rotate relative to the base 1041, and the driving rod 1043 is slidably connected to the blade driving ring 103, to drive the blade driving ring 103 to rotate, thereby driving, by using the blade driving ring 103, the light-shielding blade 101 to rotate to block or expose the lens of the camera module. In this way, a diaphragm part and the electromagnetic driving assembly 104 are separated from the lens, a counterweight of the camera module can be optimized, and a burden on an autofocus mechanism is reduced. In addition, due to overall independent arrangement, electrical wiring of the electromagnetic driving assembly 104 can be arranged on a periphery of the lens without affecting focusing movement of the lens.

It should be noted that, the light-shielding blade 101 does not fully block the lens, that is, when the light-shielding blade 101 reaches a maximum blocking area for the lens, there is still a specified area of the lens that can be exposed. It should be understood that, if necessary, the light-shielding blade 101 may fully block the lens when reaching the maximum blocking area for the lens.

Figure 4:
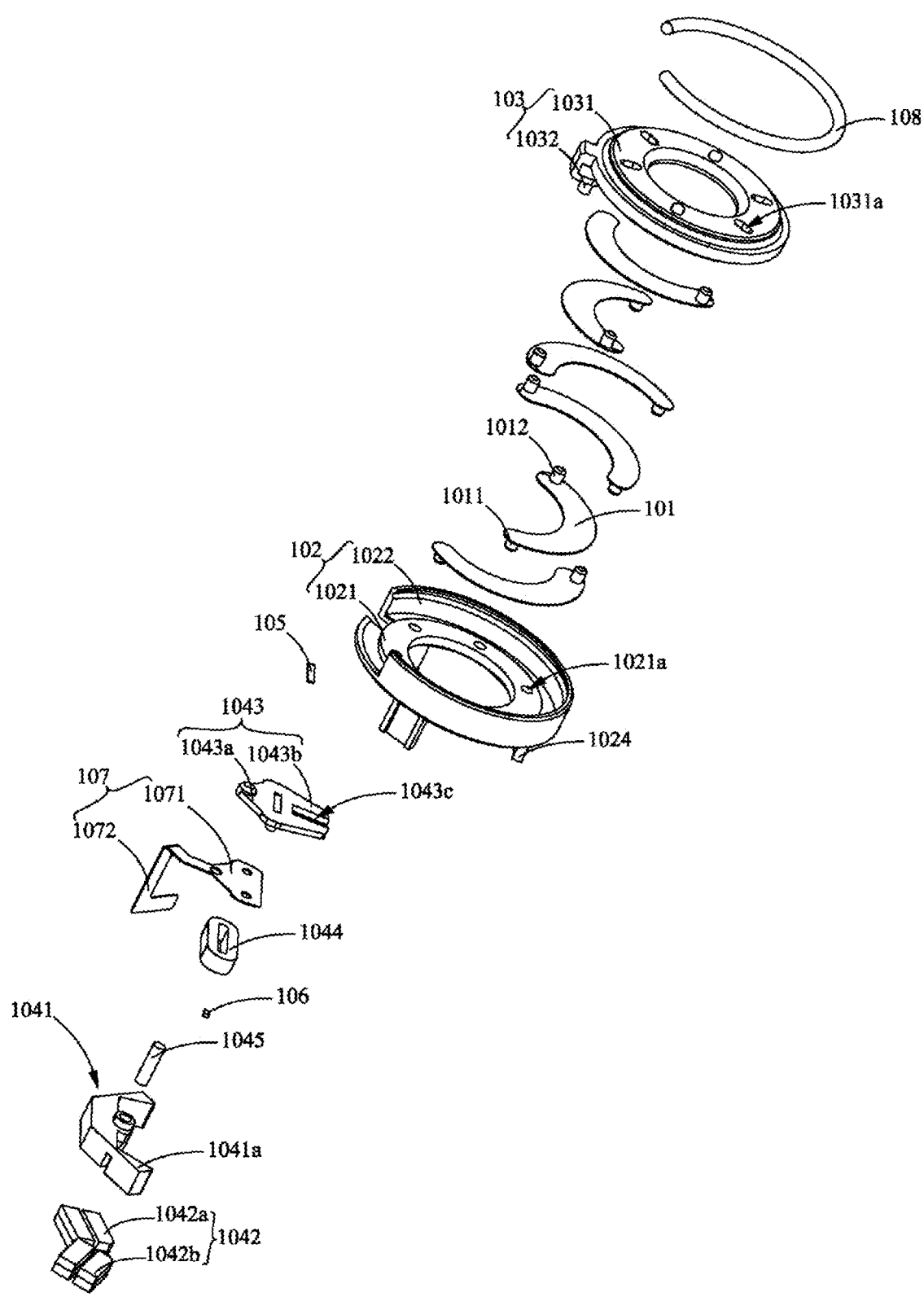
FIG. 4 is a schematic diagram illustrating an exploded view of a structure of the adjustable diaphragm according to the first embodiment of the present disclosure.

Refer to FIG. 4 and FIG. 5 again. In this embodiment, the driving rod 1043 includes a mounting portion 1043a and a driving arm 1043b fixedly connected to the mounting portion 1043a. The mounting portion 1043a is rotatably fixed on the base 1041, and the driving coil 1044 is fixed on the mounting portion 1043a. There are two driving arms 1043b, and the two driving arms 1043b are arranged at intervals and form a driving slot 1043c. The blade driving ring 103 includes a driving ring portion 1031 and a driving shaft 1032 fixedly connected to the driving ring portion 1031, and the driving shaft 1032 slidably extends into the driving slot 1043c.

Figure 3:
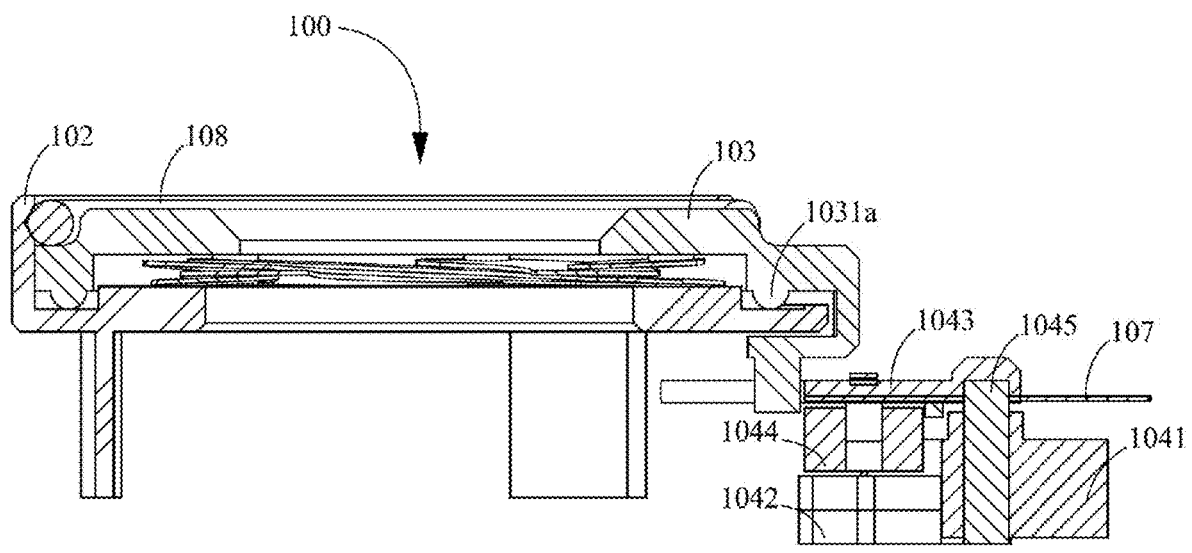
FIG. 3 is a schematic diagram illustrating a cross-sectional view of the adjustable diaphragm shown in FIG. 2 along a line AA'.

Refer to FIG. 3 and FIG. 4 again. To be specific, the driving rod 1043 may be rotatably connected to the base 1041 in a manner of pivoting, for example, be inserted into and fixed on the base 1041 by using a pivoting shaft 1045, and the mounting portion 1043a is rotatably sleeved on an outer circumference of the pivoting shaft 1045 relative to the pivoting shaft 1045. Alternatively, the pivoting shaft 1045 is rotatably inserted into the base 1041 relative to the base 1041, and the pivoting shaft 1045 and the mounting portion 1043a are fixedly connected. Alternatively, the pivoting shaft 1045 is rotatable relative to both the base 1041 and the mounting portion 1043a.

When the driving coil 1044 is energized, the driving coil 1044 moves due to influence of the Lorentz force in a magnetic field of the driving magnet 1042. Because the driving coil 1044 is fixed on the mounting portion 1043a and the mounting portion 1043a is constrained by the pivoting shaft 1045, the mounting portion 1043a rotates relative to the base 1041, thereby driving the two driving arms 1043b to rotate by using an axis of the pivoting shaft 1045 as a rotating shaft. The driving shaft 1032 of the blade driving ring 103 may slidably extend into the driving slot 1043c formed by the two driving arms 1043b, the two driving arms 1043b push, when rotating, the driving shaft 1032 to drive the driving ring portion 1031 to rotate by using an axis of the driving ring portion 1031 as a rotating shaft, and the driving ring portion 1031 drives, when rotating, the light-shielding blade 101 to move to block or expose the lens of the camera module.

Figure 5:
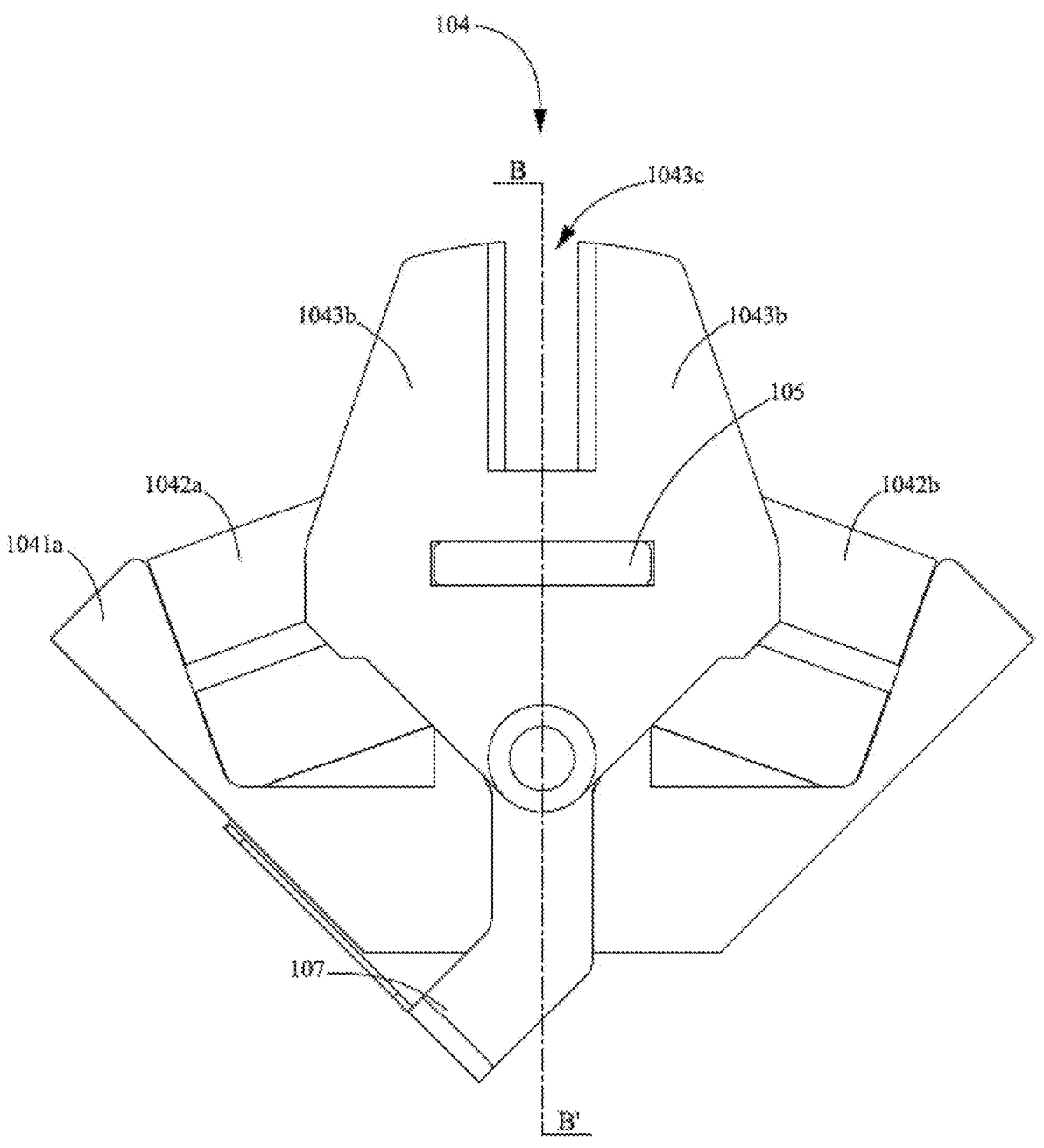
FIG. 5 is a schematic diagram illustrating a front view of an electromagnetic driving assembly of the adjustable diaphragm according to the first embodiment of the present disclosure.
Figure 6:
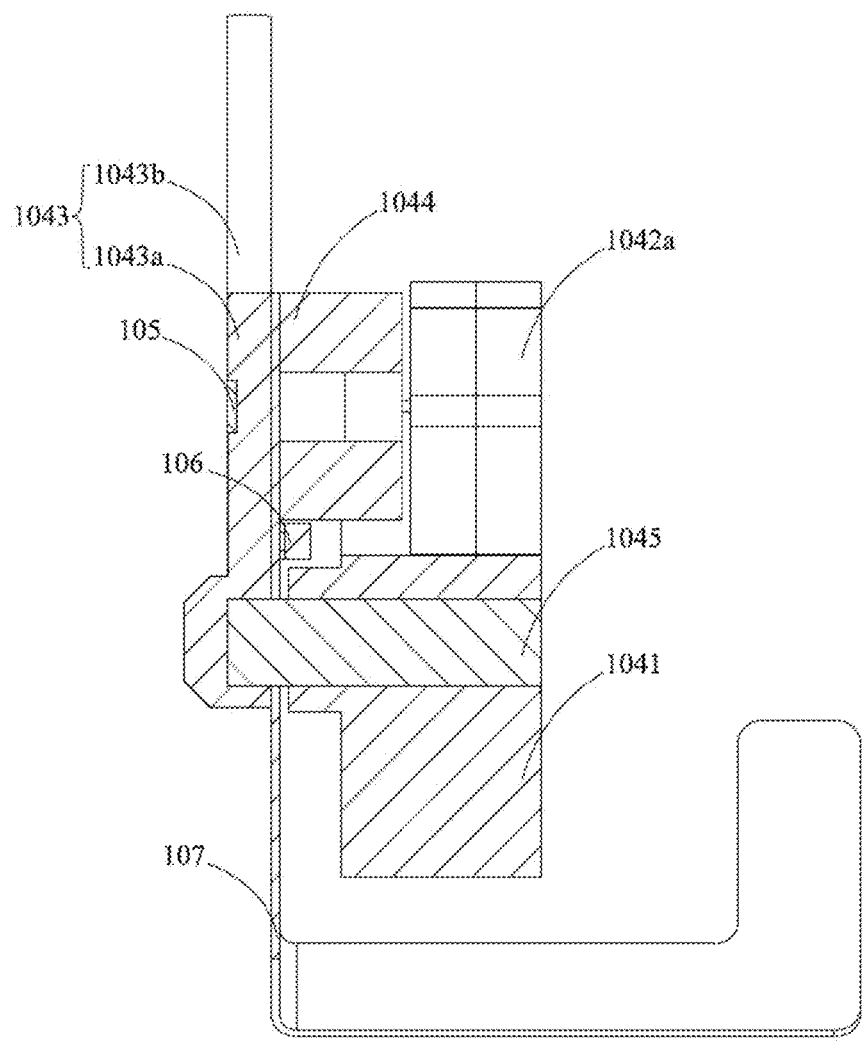
FIG. 6 is a schematic diagram illustrating a cross-sectional view of the electromagnetic driving assembly shown in FIG. 5 along a line BB'.
Figure 7:
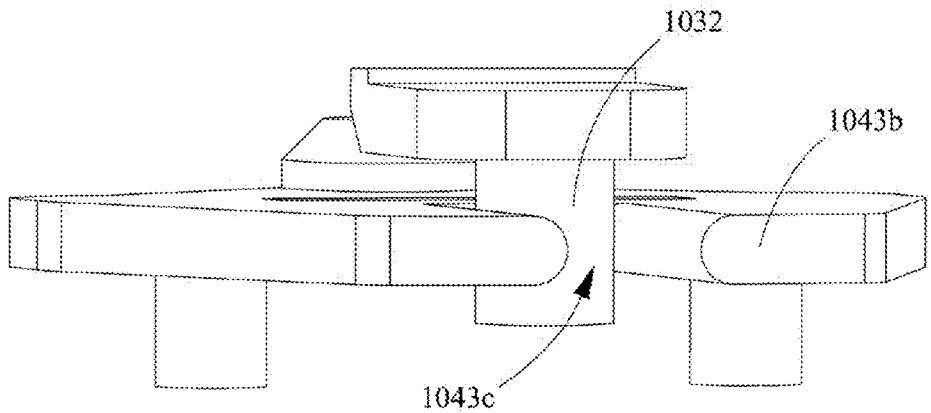
FIG. 7 is a schematic diagram illustrating cooperation between a driving arm and a driving shaft of the adjustable diaphragm according to the first embodiment of the present disclosure.

Refer to FIG. 5 to FIG. 7 together. Further, side walls that are of the two driving arms 1043b and are opposite to each other are both arranged as circular arc side walls protruding outward, and the driving shaft 1032 is cylindrical. In an actual scenario, due to a counterweight of the camera module, or affected by vibration, the lens of the camera module may tilt, and the tilting of the lens may cause the blade driving ring 103 to tilt, finally causing the driving shaft 1032 to tilt relative to the two driving arms 1043b. If the side walls that are of the two driving arms 1043b and are opposite to each other are plane surfaces or concave surfaces, the driving shaft 1032 may get stuck, resulting in failure of transmission between the driving arms 1043b and the driving shaft 1032. When the side walls that are of the two driving arms 1043b and are opposite to each other are arranged as the circular arc side walls protruding outward, or a part of side walls of a cylinder, when the driving shaft 1032 tilts, upper and lower parts of the circular arc side walls may provide a specified avoidance space, to avoid the driving shaft 1032, so that the driving shaft 1032 is not stuck, thereby smoothly implementing transmission.

Further, to enable the driving shaft 1032 to smoothly move in the driving slot 1043c, surface accuracy of the two circular arc side walls may be set according to an actual need, to make the two circular arc side walls smooth enough.

In some embodiments, the mounting portion 1043a and the two driving arms 1043b are integrally arranged. In this way, a quantity of components of the adjustable diaphragm 100 can be reduced, thereby reducing difficulty in assembly and improving production efficiency.

Refer to FIG. 2, FIG. 4, FIG. 5, FIG. 8, and FIG. 9 together. In this embodiment, the driving magnet 1042 includes a first sub-magnet 1042a and a second sub-magnet 1042b. The first sub-magnet 1042a and the second sub-magnet 1042b are arranged at an angular interval, and polarities of magnetic poles that are of the first sub-magnet 1042a and the second sub-magnet 1042b and are adjacent to the blade supporting ring 102 are different. The driving coil 1044, when energized, is subjected to force in a same direction in a magnetic field of the first sub-magnet 1042a and a magnetic field of the second sub-magnet 1042b to drive the driving rod 1043 to rotate.

Figure 8:
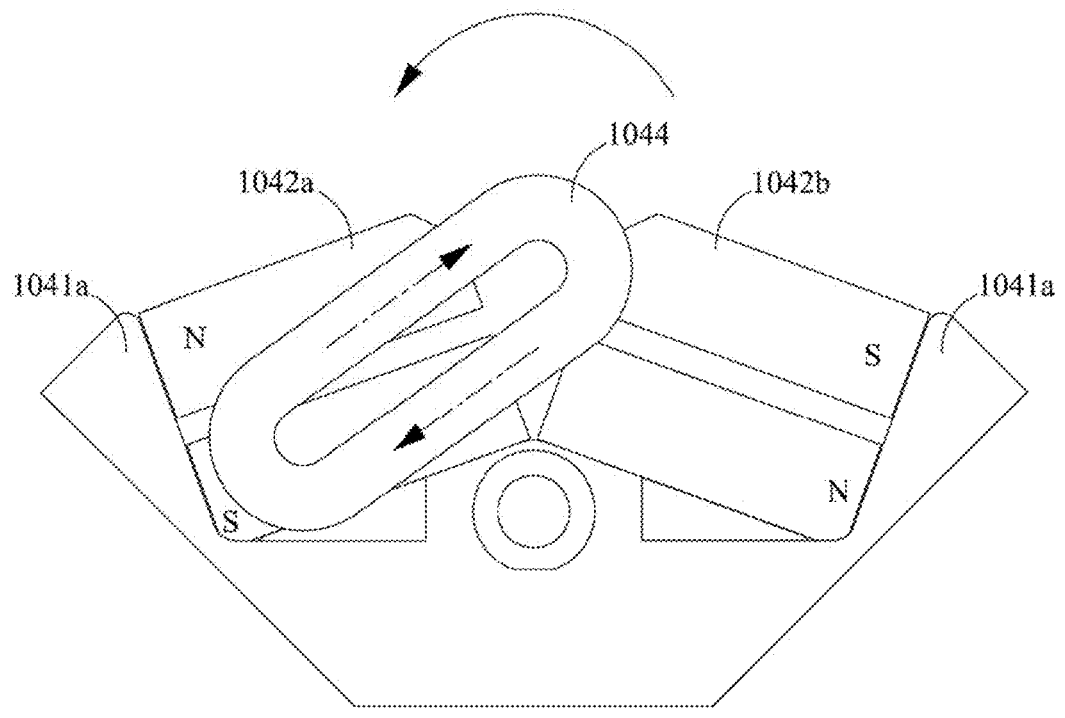
FIG. 8 is a schematic diagram illustrating counterclockwise rotation of a driving coil of the adjustable diaphragm under an action of Lorentz force according to the first embodiment of the present disclosure.
Figure 9:
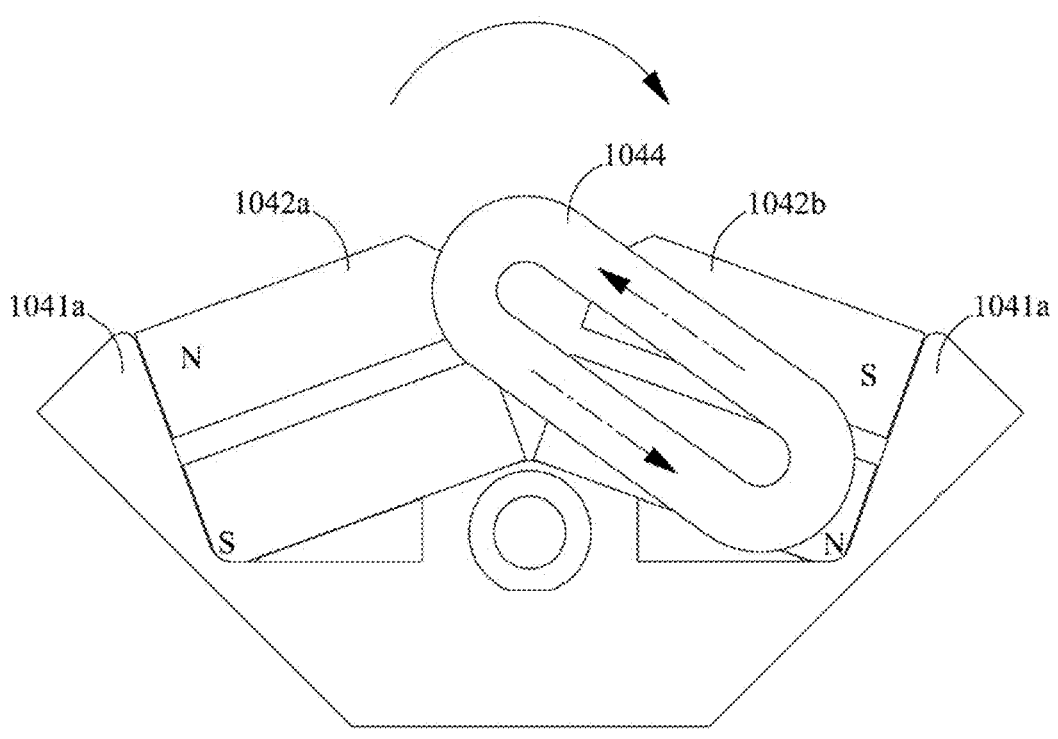
FIG. 9 is a schematic diagram illustrating clockwise rotation of the driving coil of the adjustable diaphragm under an action of Lorentz force according to the first embodiment of the present disclosure.

For example, as shown in FIG. 4, FIG. 8, and FIG. 9, the base 1041 is in a "W" shape as a whole, the pivoting shaft 1045 is located in a middle part of the base 1041, and the first sub-magnet 1042a and the second sub-magnet 1042b are located on two sides relative to the middle part of the base 1041 and cooperate with inclined arms 1041a at both ends of the base 1041 for fixing, so that axes of the first sub-magnet 1042a and the second sub-magnet 1042b are arranged at an included angle, which may be between 0° and 180° (excluding 0° and 180°), such as 120° or another angle. An N pole of the first sub-magnet 1042a is adjacent to the blade supporting ring 102, and an S pole of the first sub-magnet 1042a is away from the blade supporting ring 102, while an S pole of the second sub-magnet 1042b is adjacent to the blade supporting ring 102, and an N pole of the second sub-magnet 1042b is away from the blade supporting ring 102. When a clockwise current flows through the driving coil 1044 (as shown by dotted arrows in FIG. 8), according to a left-hand rule, the driving coil 1044 is subjected to downward Lorentz force in the magnetic field of the first sub-magnet 1042a, and the driving coil 1044 is subjected to upward Lorentz force in the magnetic field of the second sub-magnet 1042b. Because the driving coil 1044 is fixed on the mounting portion 1043a, under a constraint of the pivoting shaft 1045, the driving coil 1044 drives the mounting portion 1043a and the driving arms 1043b to rotate counterclockwise (as shown by a curved arrow in FIG. 8), and the driving arms 1043b drive the blade driving ring 103 to rotate clockwise, so that the light-shielding blade 101 blocks the lens of the camera module. On the contrary, when a counterclockwise current flows through the driving coil 1044 (as shown by dotted arrows in FIG. 9), a direction of force acting on the driving coil 1044 is opposite, thereby driving the mounting portion 1043a and the driving arms 1043b to rotate clockwise (as shown by a curved arrow in FIG. 9), and the driving arms 1043b drive the blade driving ring 103 to rotate counterclockwise, so that the light-shielding blade 101 exposes the lens of the camera module.

In this embodiment, the driving rod 1043 is substantially plate-shaped, and a thickness direction of the driving rod 1043 is parallel to an axial direction of the driving ring portion 1031. In this case, a rotation plane of the mounting portion 1043a and the two driving arms 1043b is perpendicular to the axis of the driving ring portion 1031, that is, a plane on which the mounting portion 1043a and the two driving arms 1043b rotate is perpendicular to the axis of the driving ring portion 1031. It should be understood that, the first sub-magnet 1042a and the second sub-magnet 1042b are both cuboid-shaped, and a plane on which magnetic poles of the two sub-magnets are located is perpendicular to the thickness direction of the driving rod 1043. This is set based on a feature of the Lorentz force.

It should be understood that it is only a feasible way that the blade driving ring 103 rotates clockwise to drive the light-shielding blade 101 to block the camera lens, or that the blade driving ring 103 rotates counterclockwise to drive the light-shielding blade 101 to expose the camera lens. On the contrary, through appropriate setting, when the blade driving ring 103 rotates clockwise, the light-shielding blade 101 may be driven to expose the camera lens, and when the blade driving ring 103 rotates counterclockwise, the light-shielding blade 101 may be driven to block the camera lens. In addition, a specific quantity of first sub-magnet 1042a and second sub-magnet 1042b is not limited, as long as through appropriate setting, when the driving coil 1044 is energized, the driving coil 1044 drives, due to influence of the Lorentz force, the mounting portion 1043a and the two driving arms 1043b to rotate.

Refer to FIG. 5 and FIG. 6 again. In this embodiment, the adjustable diaphragm 100 further includes a closed magnet yoke 105, arranged on the mounting portion 1043a and configured to form a closed magnetic field with the driving magnet 1042.

To be specific, the closed magnet yoke 105 may be arranged on a surface of the mounting portion 1043a facing away from the driving coil 1044, and the closed magnet yoke 105, the first sub-magnet 1042a, and the second sub-magnet 1042b form the closed magnetic field, which can avoid magnetic leakage, and improve efficiency of driving the driving coil 1044 by the first sub-magnet 1042a and the second sub-magnet 1042b when the driving coil 1044 is energized. Further, when the driving coil 1044 is not energized, the closed magnet yoke 105 continuously applies magnetic attraction to the driving coil 1044, so that a position of the driving coil 1044 can remain relatively stable, thereby keeping an amount of light entering the adjustable diaphragm 100 stable. Even if a size of a light inlet of the adjustable diaphragm 100 is changed due to influence of unexpected vibration, the closed magnet yoke 105 may also drive, by attracting the driving coil 1044, the driving arms 1043b to move, thereby restoring the size of the light inlet to the original by the driving arms 1043b driving the driving ring portion 1031 to rotate. That is, the closed magnet yoke 105 can also act like a spring, to eliminate the influence of the vibration on the adjustable diaphragm 100. In addition, during driving the driving ring portion 1031, the closed magnet yoke 105 can also use this magnetic attraction function to eliminate jitter or shaking during transmission, to improve stability.

Figure 10:
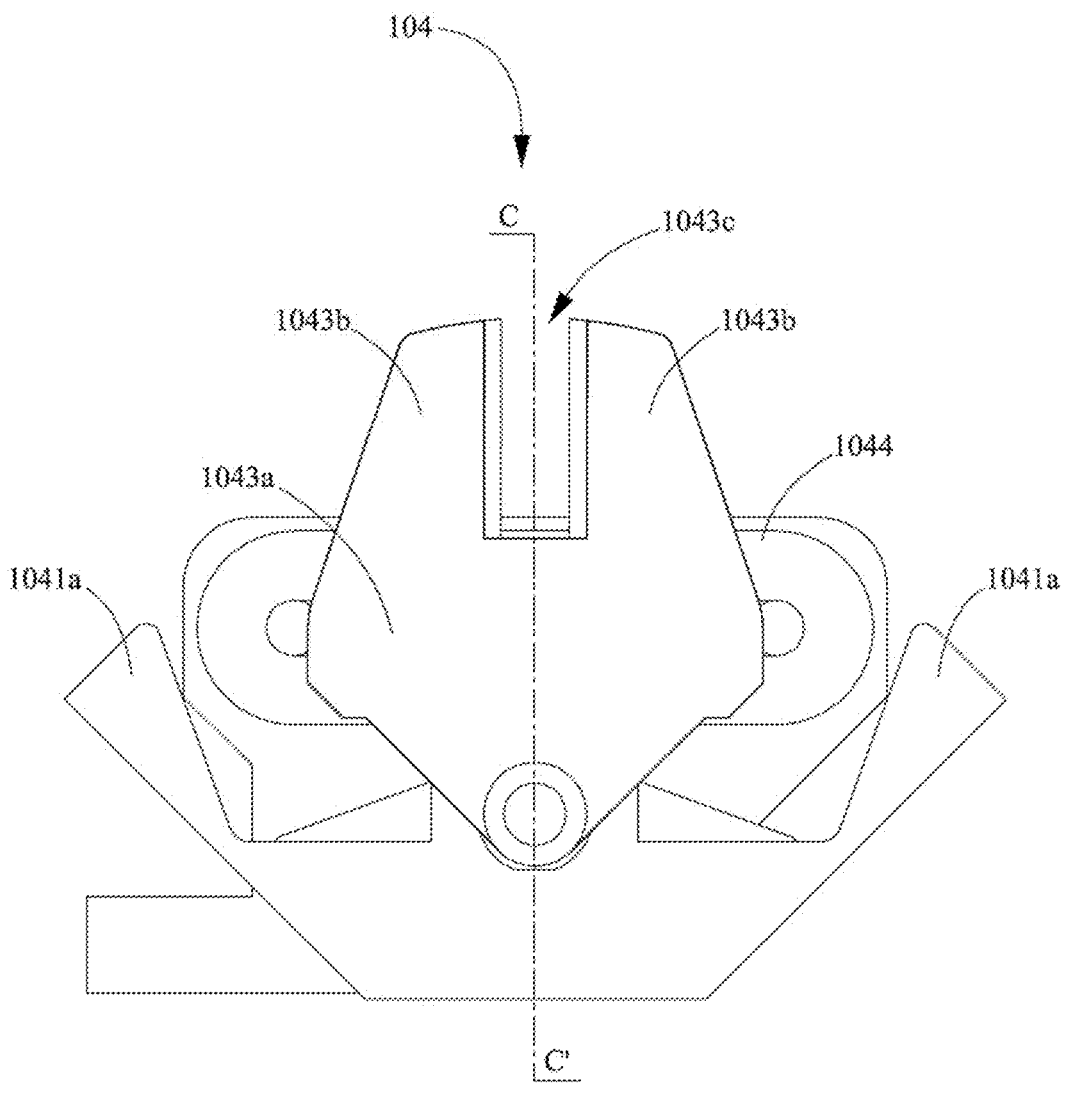
FIG. 10 is a schematic diagram illustrating a front view of another electromagnetic driving assembly of the adjustable diaphragm according to the first embodiment of the present disclosure.
Figure 11:
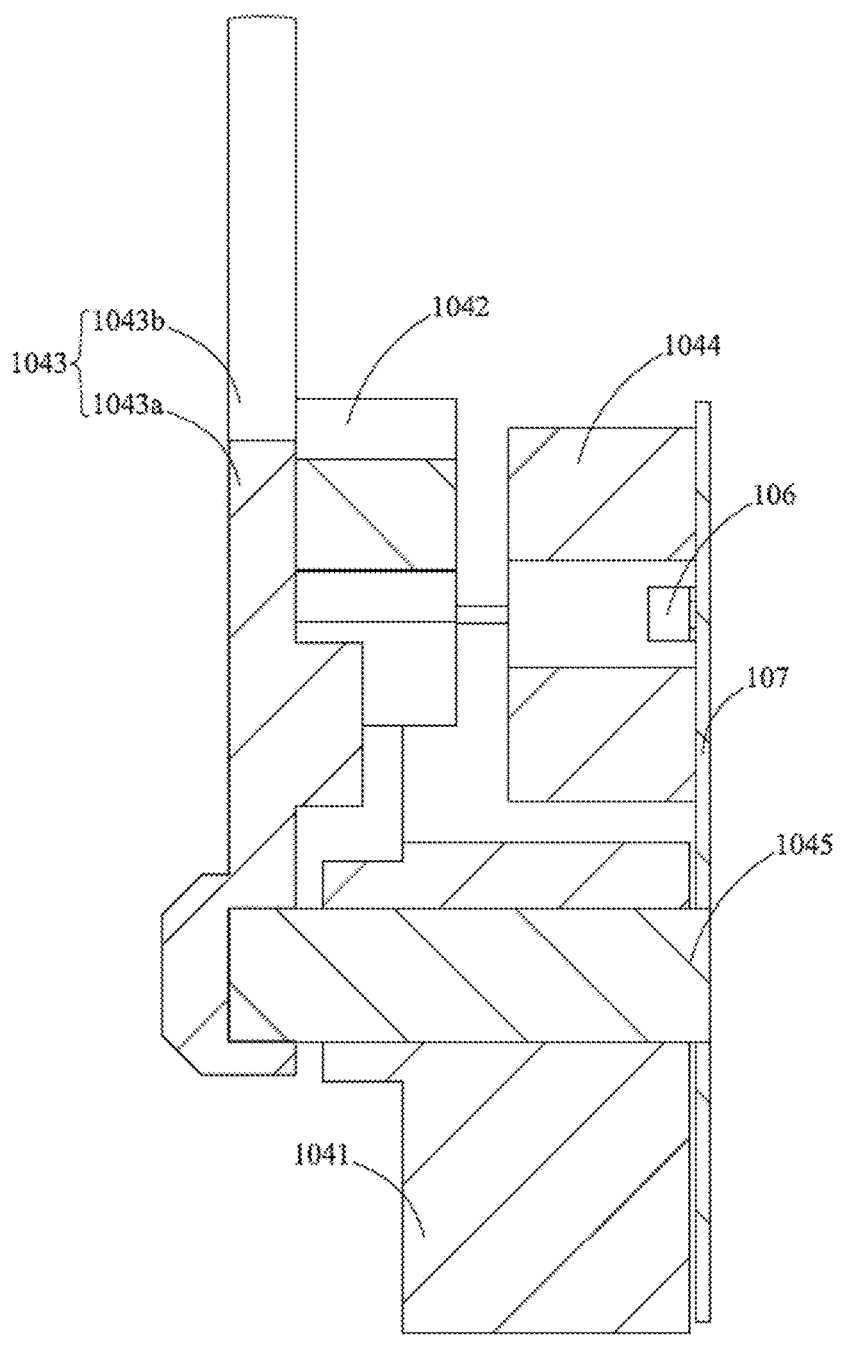
FIG. 11 is a schematic diagram illustrating a cross-sectional view of the electromagnetic driving assembly shown in FIG. 10 along a line CC'.

Refer to FIG. 10 and FIG. 11. In another feasible embodiment, arranged positions of the driving magnet 1042 and the driving coil 1044 may be exchanged, that is, the driving magnet 1042 is arranged on the mounting portion 1043a, and the driving coil 1044 is arranged on the base 1041. In this case, the closed magnet yoke 105 may not be arranged, and movement in this arrangement manner is still implemented by driving of the Lorentz force. Arrangement of other components is substantially the same, and is not described in detail.

Refer to FIG. 4 to FIG. 6 again. In some embodiments, the adjustable diaphragm 100 further includes a position detection element 106, arranged on the mounting portion 1043a. The position detection element 106 detects a rotation angle of the blade driving ring 103 by detecting a relative position of the driving magnet 1042.

Specifically, the position detection element 106 may be arranged on a side of the mounting portion 1043a toward the driving magnet 1042, for example, arranged adjacent to the driving coil 1044. When the mounting portion 1043a rotates, position of the position detection element 106 relative to the first sub-magnet 1042a and position of the position detection element 106 relative to the second sub-magnet 1042b both change. At different positions, magnetic field intensities, magnetic induction intensities, magnetic field directions, and magnetic fluxes that are of the first sub-magnet 1042a and the second sub-magnet 1042b and that are detected by the position detection element 106 are all different. The position detection element 106 determines a rotation angle of the mounting portion 1043a by detecting these changes. A correspondence between the rotation angle of the mounting portion 1043a and a rotation angle of the driving ring portion 1031 may be preset according to an actual need. This type of correspondence between rotation angles of different components is clear for a person skilled in the art, and details are not described herein again.

Optionally, the position detection element 106 may be a Hall element.

Refer to FIG. 4 and FIG. 5 again. In this embodiment, the adjustable diaphragm 100 further includes a flexible printed circuit 107, fixed on the mounting portion 1043a and located between the mounting portion 1043a and the driving coil 1044. The flexible printed circuit 107 is electrically connected to the driving coil 1044 and the position detection element 106. The flexible printed circuit 107 includes a fixed portion 1071 fixed on the mounting portion 1043a and a bent portion 1072 that is bent and extends. The fixed portion 1071 and the bent portion 1072 may be separately arranged and electrically connected, or may be integrally arranged. The fixed portion 1071 may be fixed on the mounting portion 1043a in a manner of a screw, a rivet, or the like. Then, the driving coil 1044 and the position detection element 106 are arranged on a side of the fixed portion 1071 facing away from the mounting portion 1043a. The fixed portion 1071 is electrically connected to the driving coil 1044 and the position detection element 106, and is electrically connected to a power supply (not shown in the figure) and a control chip (not shown in the figure) through the bent portion 1072. Position information detected by the position detection element 106 is sent to the control chip through the flexible printed circuit 107, and then the control chip sends a control instruction based on the received position information and adjusts a direction and/or size of a current provided for the driving coil 1044, to adjust a rotation direction and/or rotation angle of the driving ring portion 1031, thereby adjusting the size of the light inlet of the adjustable diaphragm 100.

Further, during the rotation of the mounting portion 1043a, the flexible printed circuit 107 has specified reaction force on the mounting portion 1043a. To reduce this influence, the bent portion 1072 may be bent a plurality of times, such as more than twice.

Figure 12:
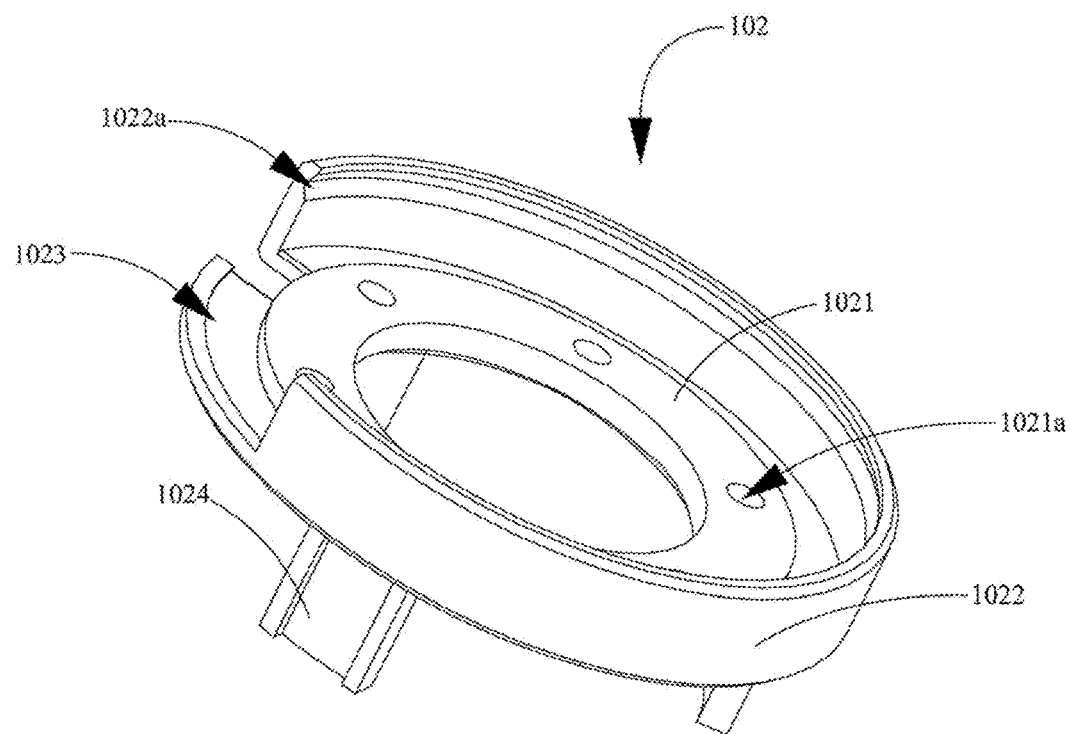
FIG. 12 is a schematic diagram illustrating a three-dimensional structure of a blade supporting ring of the adjustable diaphragm according to the first embodiment of the present disclosure.

Refer to FIG. 1, FIG. 4, and FIG. 12 again. In this embodiment, the blade supporting ring 102 includes a supporting ring portion 1021 and a side wall 1022 extending from the supporting ring portion 1021 to the blade driving ring 103. The side wall 1022 extends along a circumferential direction of the supporting ring portion 1021. The side wall 1022 has a circular arc-shaped notch 1023. The driving ring portion 1031 is accommodated in a space enclosed by the side wall 1022 and is arranged relative to the supporting ring portion 1021, and the driving shaft 1032 extends to a periphery of the side wall 1022 through the circular arc-shaped notch 1023 and is bent and extends toward the driving arms 1043b.

To be specific, when the driving shaft 1032 rotates to a specified position, the driving shaft 1032 is blocked by an end portion of the side wall 1022 located at the circular arc-shaped notch 1023 and cannot continue to rotate. Therefore, an angle corresponding to an arc length of the circular arc-shaped notch 1023 may be regarded as a rotation angle range of the supporting ring portion 1021. A space enclosed by the supporting ring portion 1021, the side wall 1022, and the driving ring portion 1031 forms a blade chamber for accommodating the light-shielding blade 101. The light-shielding blade 101 moves in the blade chamber to change the size of the light inlet of the adjustable diaphragm 100.

Figure 13:
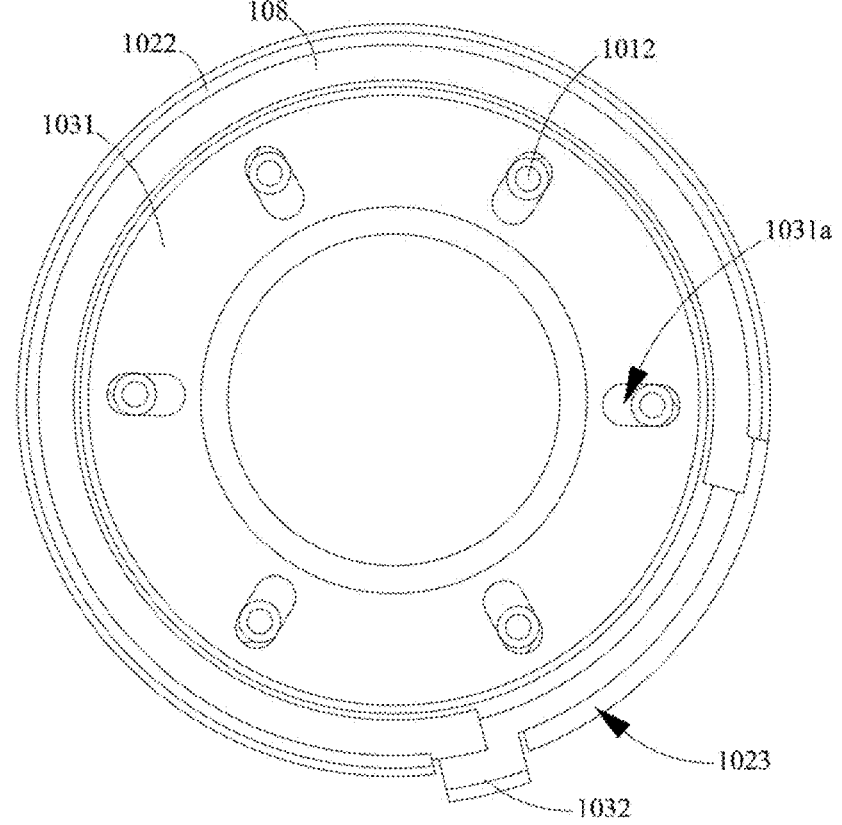
FIG. 13 is a schematic diagram illustrating the adjustable diaphragm fully opened according to the first embodiment of the present disclosure.
Figure 14:
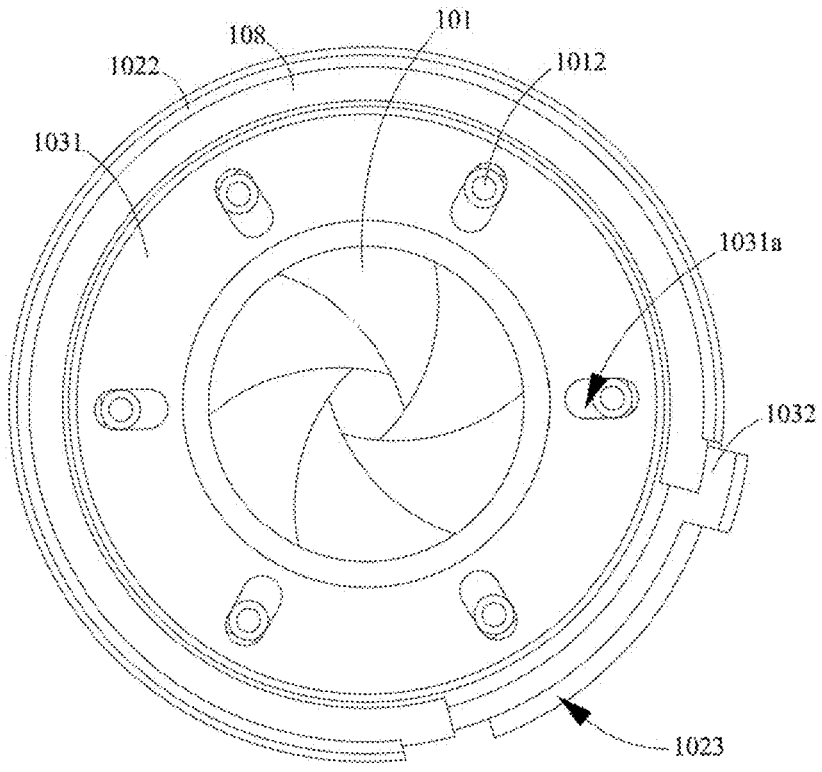
FIG. 14 is a schematic diagram illustrating the adjustable diaphragm fully closed according to the first embodiment of the present disclosure.

Refer to FIG. 12 again, and refer to FIG. 13 and FIG. 14. More specifically, the supporting ring portion 1021 is provided with positioning holes 1021a, the driving ring portion 1031 is provided with sliding slots 1031a extending along a radial direction of the driving ring portion 1031, the light-shielding blade 101 is provided with a positioning portion 1011 on an image side of the light-shielding blade 101, and the positioning portion 1011 rotatably extends, relative to the supporting ring portion 1021, into the positioning hole 1021a. The light-shielding blade 101 is provided with a sliding portion 1012 on an object side of the light-shielding blade 101, and the sliding portion 1012 slidably extends, relative to the driving ring portion 1031, into the sliding slot 1031a. When the driving ring portion 1031 rotates, the sliding portion 1012 slides in the sliding slot 1031a, while the light-shielding blade 101 is constrained by the positioning portion 1011 and can only rotate by using an axis of the positioning portion 1011 as a rotating shaft, thereby blocking the lens or exposing the lens.

Refer to FIG. 3 again. Because the driving ring portion 1031 needs to rotate relative to the supporting ring portion 1021 during driving the light-shielding blade 101, to reduce frictional resistance of the supporting ring portion 1021 to the driving ring portion 1031, an annular protrusion 1031b extending along a circumferential direction of the driving ring portion 1031 may be arranged on a surface of the driving ring portion 1031 toward the supporting ring portion 1021. A shape of a cross-section of the annular protrusion 1031b in the radial direction of the driving ring portion 1031 is semicircular. Alternatively, a plurality of hemispherical protrusions may be arranged at intervals along the circumferential direction of the driving ring portion 1031. Alternatively, a plurality of grooves (not shown in the figure) may be provided at intervals along the circumferential direction of the driving ring portion 1031, and a ball (not shown in the figure) may be arranged in the groove.

Optionally, in this embodiment, there may be a plurality of light-shielding blades 101, for example, more than three light-shielding blades 101, and more specifically, there may be five light-shielding blades 101. A single light-shielding blade may be in a shape of a circular arc sheet, where the positioning portion 1011 is arranged at an end of the light-shielding blade, and the sliding portion 1012 is arranged at another end of the light-shielding blade. The plurality of light-shielding blades 101 are arranged at intervals along the circumferential direction of the supporting ring portion 1021, and any adjacent light-shielding blades 101 are overlapped. For example, an end of one light-shielding blade 101 at which the positioning portion 1011 is arranged is placed on an image side of a light-shielding blade 101 adjacent to the end, and an end of the light-shielding blade 101 at which the sliding portion 1012 is arranged is placed on an object side of a light-shielding blade adjacent to the end. The same applies to another light-shielding blade 101. Correspondingly, a plurality of positioning holes 1021a are provided at intervals along the circumferential direction of the supporting ring portion 1021, and a plurality of sliding slots 1031a are provided at intervals along the circumferential direction of the driving ring portion 1031.

The plurality of light-shielding blades 101 enclose the light inlet of the adjustable diaphragm 100. It should be understood that, the greater the quantity of light-shielding blades 101, the closer the enclosed light inlet is to a circle, and the more precise and delicate an adjustment effect is. However, the greater the quantity of light-shielding blades 101, the greater weight, volume, and assembly difficulty. Therefore, the quantity of light-shielding blades 101 is generally set between three and six. When there is another need, the quantity may be set to more.

In this embodiment, an arc length of the light-shielding blade 101 is set to 30% to 60% of a circumference of a circle corresponding to the light-shielding blade 101. This can not only avoid an excessive weight of the light-shielding blade 101 to ensure sensitivity of the adjustable diaphragm 100, but also avoid interference between the light-shielding blades 101 during movement.

Further, an area of the light inlet enclosed by the light-shielding blades 101 may be 30% to 60% of an area of the circle corresponding to a single light-shielding blade 101.

In this embodiment, a plurality of supporting legs 1024 are arranged at intervals along the circumferential direction of the supporting ring portion 1021. The plurality of supporting legs 1024 are located on an outer edge of the supporting ring portion 1021 or a side of the supporting ring portion 1021 facing away from the driving ring portion 1031, and extend in a direction away from the driving ring portion 1031. When the adjustable diaphragm 100 is carried in the camera module, the plurality of supporting legs 1024 abut against the lens, to keep a specified distance between the supporting ring portion 1021 and the lens, and prevent the supporting ring portion 1021 from interfering in focusing movement of the lens.

Refer to FIG. 1 to FIG. 4, and FIG. 12 again. In this embodiment, the adjustable diaphragm 100 further includes an arc-shaped positioning member 108, arranged in the space enclosed by the side wall 1022 and located on a side of the driving ring portion 1021 facing away from the supporting ring portion 1031. The arc-shaped positioning member 108 is configured to fix the driving ring portion 1031 in an axial direction of the driving ring portion 1031. In this way, the driving ring portion 1031 is fixed in the axial direction by using the arc-shaped positioning member 108, so that the driving ring portion 1031 is prevented from escaping from the space enclosed by the side wall 1022.

Further, a positioning slot 1022a extending circumferentially is provided on an inner wall surface of the side wall 1022, and the arc-shaped positioning member 108 is partially embedded in the positioning slot 1022a. By setting the arc-shaped positioning member 108 partially embedded in the positioning slot 1022a, and positioned via the positioning slot 1022a, the arc-shaped positioning member 108 can continuously and stably keep a position of the driving ring portion 1031.

It should be understood that, because the driving shaft 1032 needs to move in the circular arc-shaped notch 1023, the arc-shaped positioning member 108 is arranged in a C shape, which is not a complete circle, and a fracture of the arc-shaped positioning member 108 corresponds to the circular arc-shaped notch 1023, or may be slightly longer or slightly shorter than the arc length of the circular arc-shaped notch 1023.

Optionally, the arc-shaped positioning member 108 may be made of metal, a polymer, and the like. The arc-shaped positioning member 108 needs to avoid affecting rotation of the driving ring portion 1031, so that the arc-shaped positioning member 108 may be preferably made of plastic, which has appropriate hardness and toughness, is not easy to break, and has a small density and a light weight. In addition, a plastic surface can be made smooth.

A second embodiment of the present disclosure provides an adjustable diaphragm 100. The adjustable diaphragm 100 in this embodiment is substantially the same as the adjustable diaphragm 100 according to the first embodiment. A main difference is that a rotation plane of two driving arms 1043b is parallel to an axis of a driving ring portion 1031.

Figure 15:
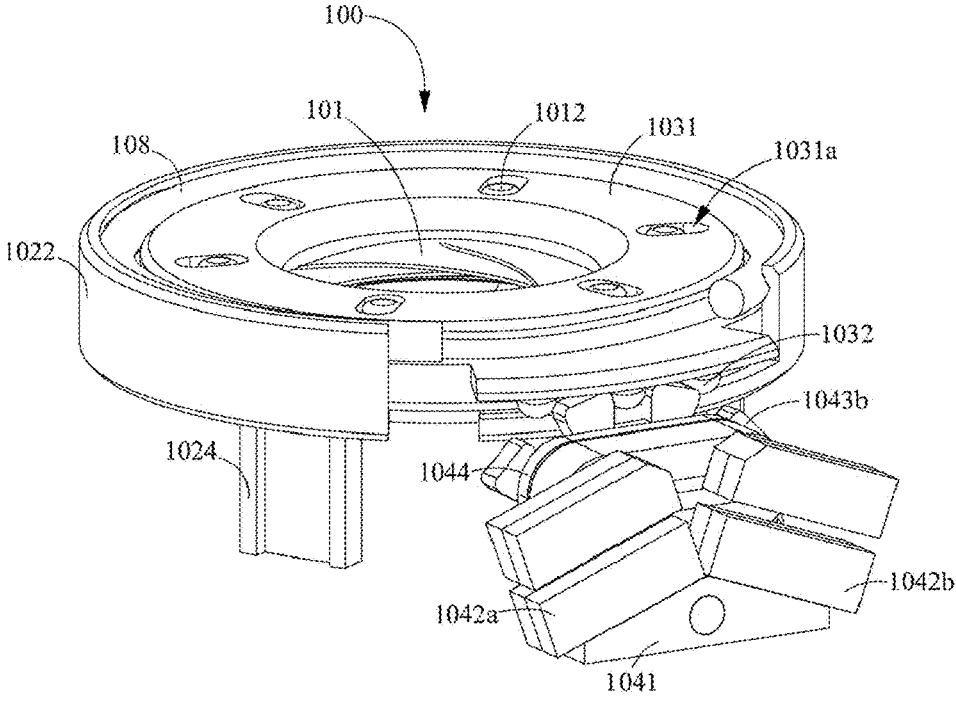
FIG. 15 is a schematic diagram illustrating a three-dimensional structure of an adjustable diaphragm according to a second embodiment of the present disclosure.
Figure 16:
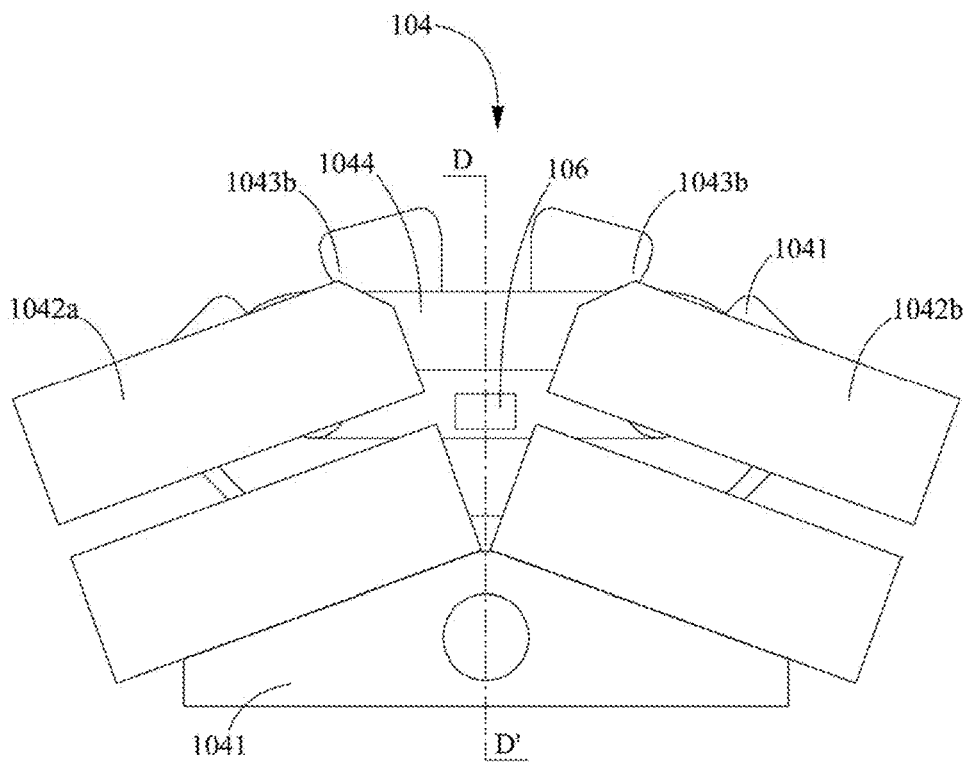
FIG. 16 is a schematic diagram illustrating a front view of an electromagnetic driving assembly of the adjustable diaphragm according to the second embodiment of the present disclosure.
Figure 17:
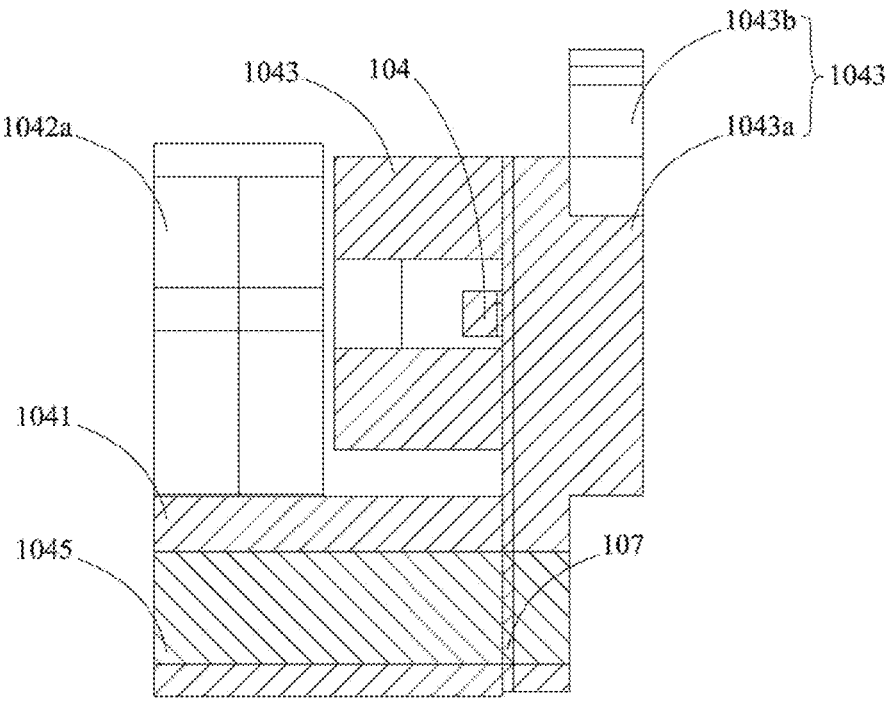
FIG. 17 is a schematic diagram illustrating a cross-sectional view of the electromagnetic driving assembly shown in FIG. 16 along a line DD'.

Refer to FIG. 15 to FIG. 17. In this embodiment, a thickness direction of a plate-shaped driving rod 1043 is perpendicular to an axial direction of the driving ring portion 1031. It should be understood that, based on a feature of Lorentz force, the base, the first sub-magnet 1042a, the second sub-magnet 1042b, and the driving coil 1044 are also adaptively adjusted according to arrangement of the driving rod 1043.

Further, the driving shaft 1032 may be directly arranged on a side of the driving ring portion 1031 toward the base 1041, and extend along the axial direction of the driving ring portion 1031. The two driving arms 1043b are located on opposite sides of the driving shaft 1032. The driving shaft 1032 may be arranged as a cylindrical protrusion, or a hemispherical protrusion, or a combination of the cylindrical protrusion and the hemispherical protrusion.

Further, a plurality of driving shafts 1032 may be arranged, and the plurality of driving shafts 1032 are arranged at intervals along a circumferential direction of the driving ring portion 1031. In this case, cooperation between the two driving arms 1043b and the plurality of driving shafts 1032 is similar to that between two gears whose axial directions are perpendicular to each other.

A third embodiment of the present disclosure provides an adjustable diaphragm 100. The adjustable diaphragm 100 in this embodiment is substantially the same as the adjustable diaphragm 100 according to the first embodiment. A main difference is that a quantity of light-shielding blades 101 is reduced.

Figure 18:
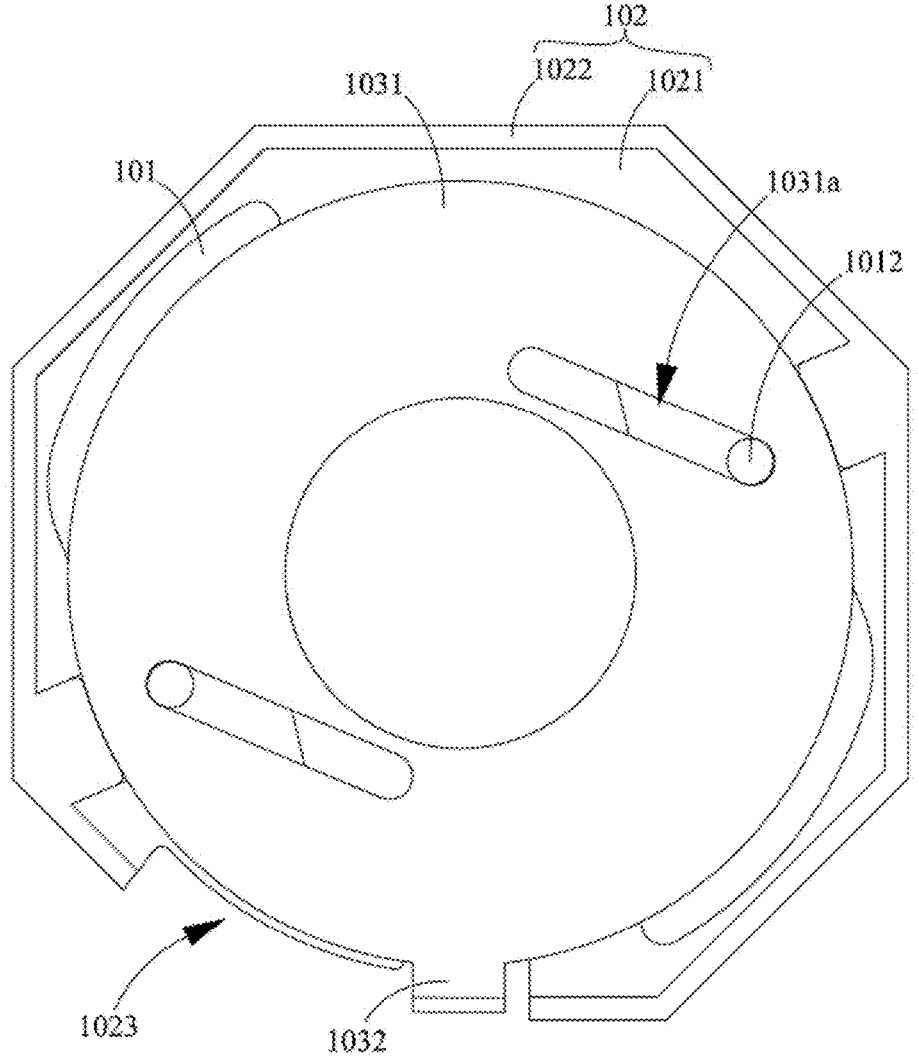
FIG. 18 is a schematic diagram illustrating a front view of a blade driving ring of an adjustable diaphragm according to a third embodiment of the present disclosure.
Figure 19:
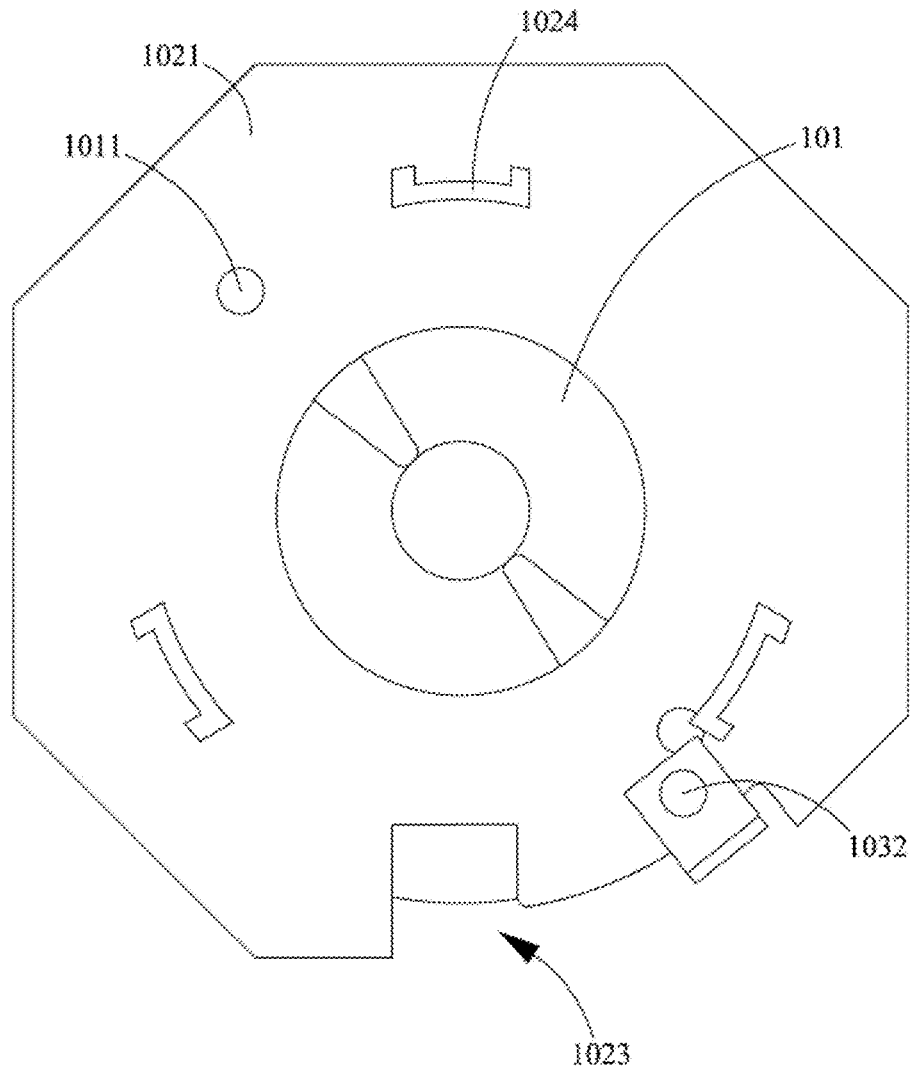
FIG. 19 is a schematic diagram illustrating a rear view of a blade supporting ring of the adjustable diaphragm according to the third embodiment of the present disclosure.

Refer to FIG. 18 and FIG. 19 together. Specifically, there are two light-shielding blades 101, arranged on a supporting ring portion 1021 in a rotationally symmetrical manner with an axis of a driving ring portion 1031 as a rotating shaft. Correspondingly, two positioning holes 1021a are provided on the supporting ring portion 1021, and two sliding slots 1031a are also provided on the driving ring portion 1031.

It should be noted that, in this embodiment, an extending direction of the sliding slot 1031a in the first embodiment is adjusted. Specifically, the sliding slot 1031a extends from a position close to an outer edge of the driving ring portion

1031 to an inner edge of the driving ring portion 1031, and the extending direction of the sliding slot 1031a is arranged at an angle to a radial direction of the driving ring portion 1031. A specific size of the angle may be adaptively adjusted according to a requirement of a specific shape, size and opening of the light-shielding blades 101. Details are not described herein again.

Figure 20:
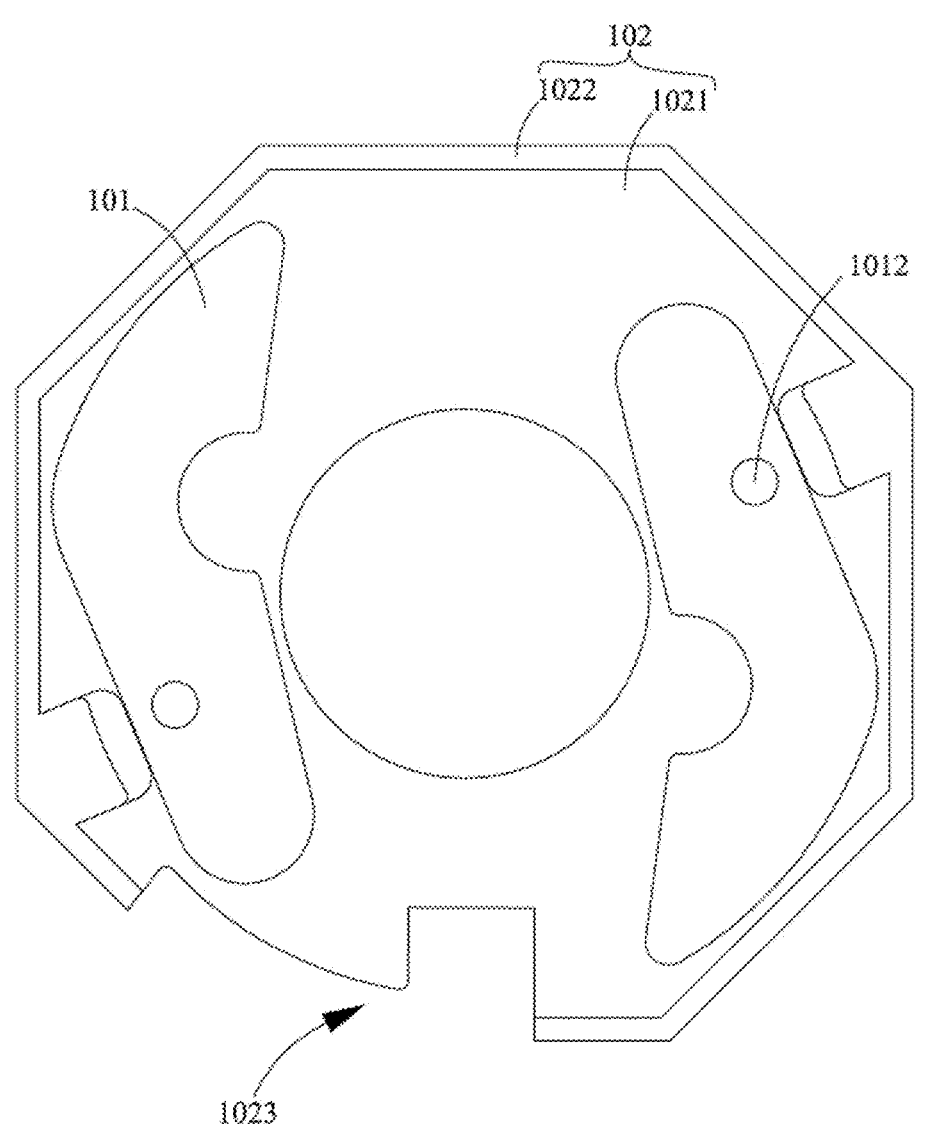
FIG. 20 is a schematic diagram illustrating the adjustable diaphragm with a light-shielding blade fully opened according to the third embodiment of the present disclosure.
Figure 21:
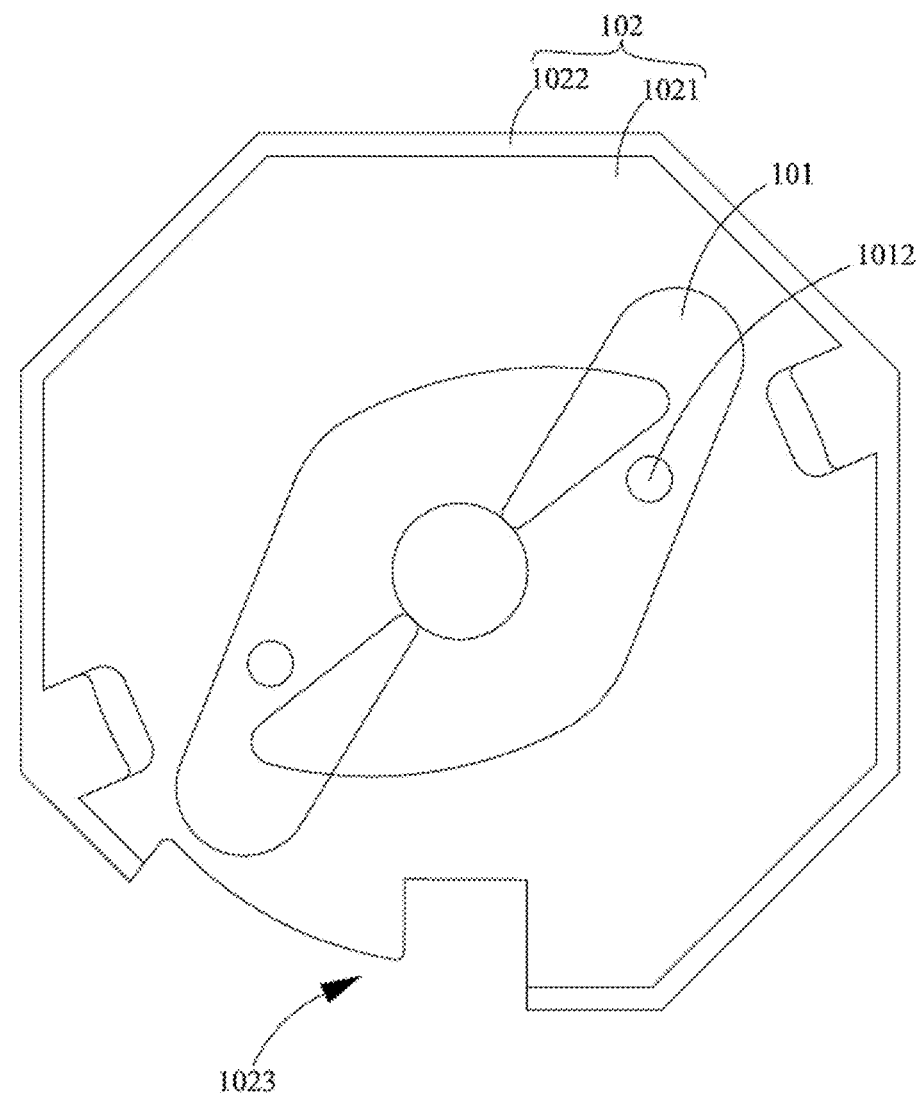
FIG. 21 is a schematic diagram illustrating the adjustable diaphragm with a light-shielding blade fully closed according to the third embodiment of the present disclosure.

For example, as shown in FIG. 20 and FIG. 21, the light-shielding blade 101 is substantially in a "J" shape, and an arc segment edge is arranged on a bent part of the light-shielding blade 101. When the driving ring portion 1031 of a lens drives the two light-shielding blades 101 to approach each other to an extreme position, the arc segment edges of the two light-shielding blades 101 combine to form a circle. The "extreme position" is a position corresponding to a case when the adjustable diaphragm 100 is carried in a camera module and a maximum blocking area of the lens is reached through movement of the two light-shielding blades 101.

Compared with the first embodiment, in this embodiment, a quantity of components of the adjustable diaphragm 100 is reduced, which can reduce a workload of assembling the adjustable diaphragm 100 and improve production efficiency.

A fourth embodiment of the present disclosure provides an adjustable diaphragm 100. The adjustable diaphragm 100 in this embodiment is substantially the same as the adjustable diaphragm 100 according to the third embodiment. A main difference is that the quantity of light-shielding blades 101 is further reduced.

Figure 22:
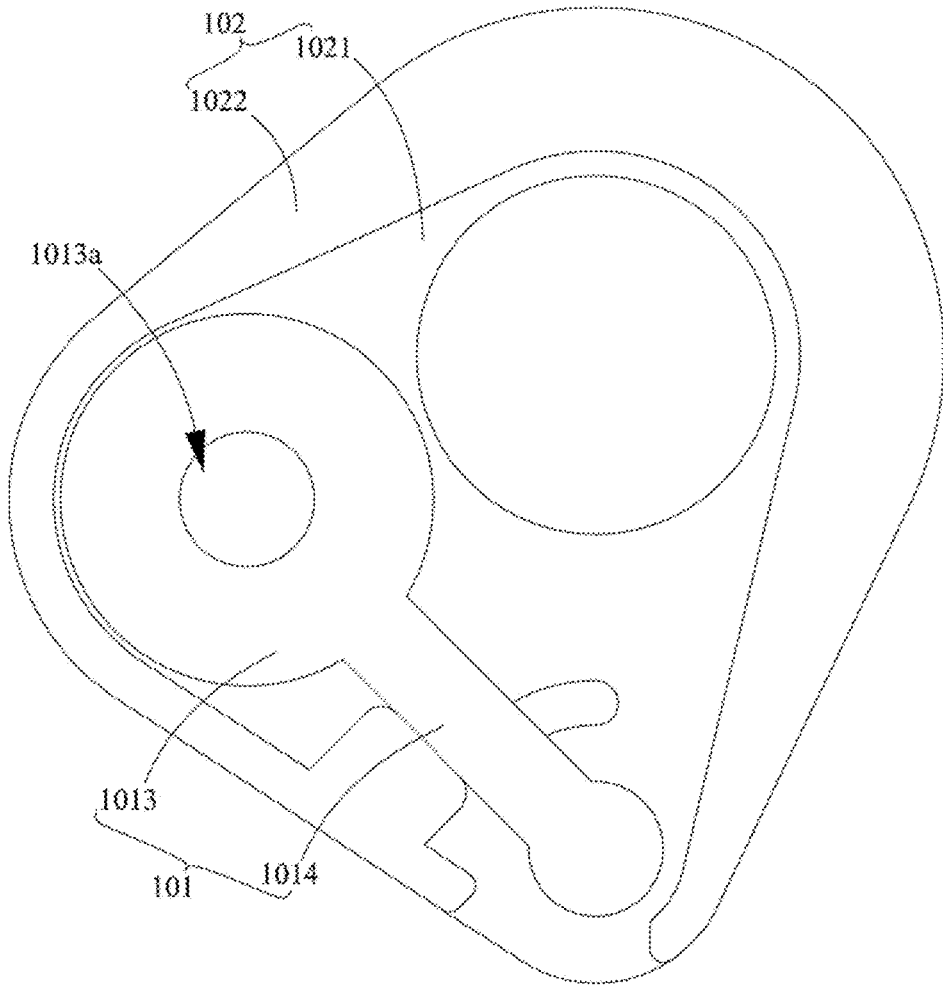
FIG. 22 is a schematic diagram illustrating an adjustable diaphragm with a light-shielding blade fully opened according to a fourth embodiment of the present disclosure.
Figure 23:
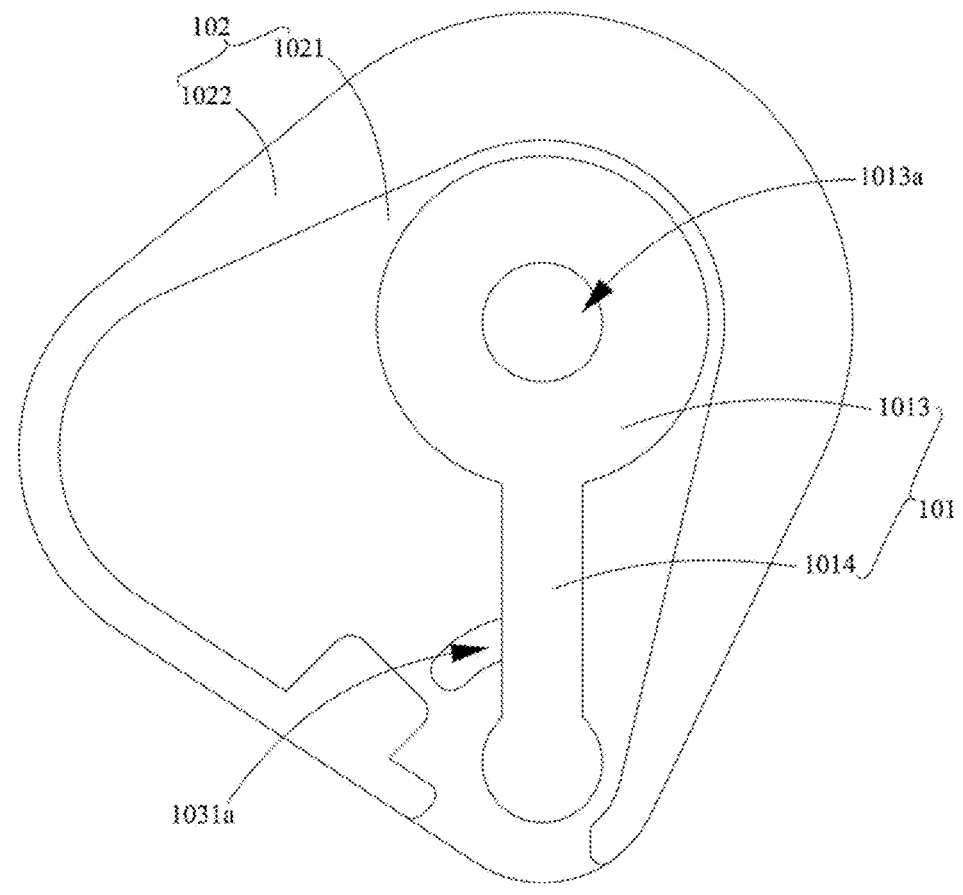
FIG. 23 is a schematic diagram illustrating the adjustable diaphragm with a light-shielding blade fully closed according to the fourth embodiment of the present disclosure.
Figure 24:
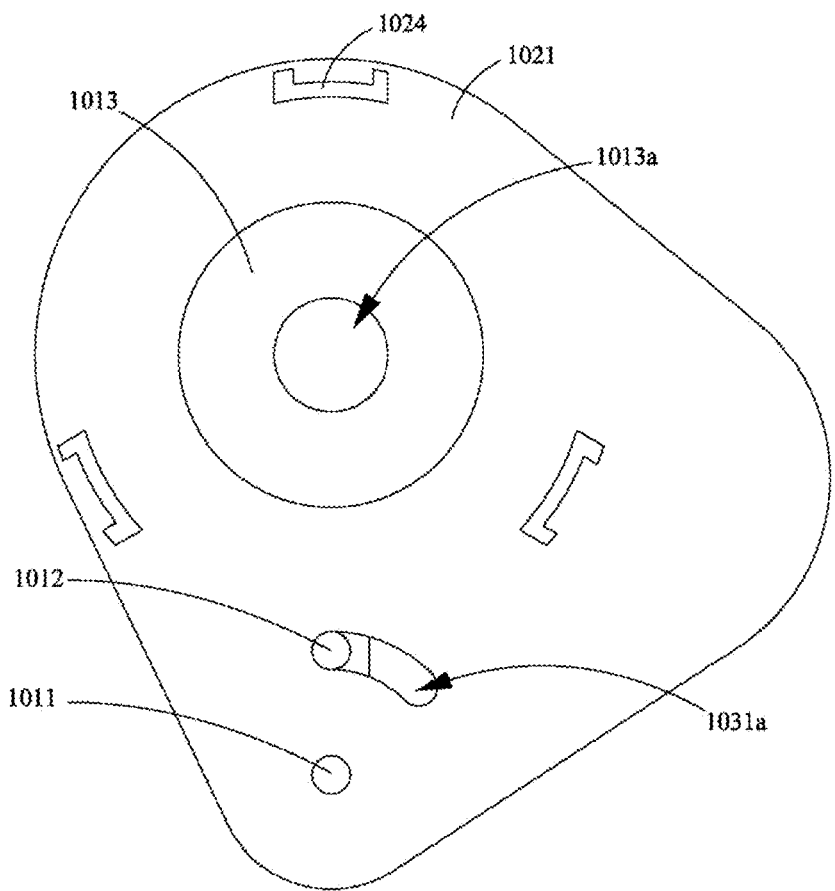
FIG. 24 is a schematic diagram illustrating a rear view of a blade supporting ring of the adjustable diaphragm according to the fourth embodiment of the present disclosure.

Refer to FIG. 22 to FIG. 24 together. In this embodiment, there is only one light-shielding blade 101. In this case, the light-shielding blade 101 may include a light-shielding portion 1013 for light shielding and a connecting shaft 1014 connected to the light-shielding portion 1013, and is similar to a structure of a circular sector with a through hole. A positioning portion 1011 is arranged at an end of the connecting shaft 1014 away from the light-shielding portion 1013, and is located on an image side of the connecting shaft 1014. A sliding portion 1012 is arranged on a middle part of the connecting shaft 1014, and is located on the image side of the connecting shaft 1014.

It should be understood that, as shown in FIG. 23, in this embodiment, a sliding slot 1031a is arranged on a supporting ring portion 1021, the sliding portion 1012 passes through the sliding slot 1031a, and the supporting ring portion 1021 is adaptively adjusted to a special shape. An inner edge of the supporting ring portion 1021 may be arranged in a contour shape matching an edge of the light-shielding blade 101, to limit a movement range of the light-shielding blade 101 and achieve a function of supporting the light-shielding blade 101.

In this embodiment, the sliding portion 1012 may be directly driven by a driving arm 1043b, so that the sliding portion 1012 drives the light-shielding portion 1013 to rotate by using an axis of the positioning portion 1011 as a rotating shaft. In this way, a driving shaft 1032 may not be arranged on a driving ring portion 1031. In this case, the driving ring portion 1031 mainly plays an axial fixing role for the light-shielding blade 101, that is, prevents the light-shielding blade 101 from escaping from the supporting ring portion 1021 in an axial direction of the supporting ring portion 1021.

Further, the light-shielding portion 1013 may be arranged in an annular shape. That is, the light-shielding portion 1013 has a circular hole 1013a, and when the light-shielding blade 101 moves to reach a maximum blocking area of a lens, the circular hole 1013*a* and the lens are substantially coaxial. Alternatively, a plurality of circular holes 1013*a* may be provided on the light-shielding portion 1013. A specific size and arrangement position of the circular holes 1013*a* can be adjusted according to an actual need. This is not specifically limited in this embodiment.

Compared with the third embodiment, in this embodiment, a quantity of components of the adjustable diaphragm 100 is further reduced, and a structure of the blade driving ring 103 can be simplified, which can reduce a workload of assembling the adjustable diaphragm 100 and improve production efficiency.

Figure 25:
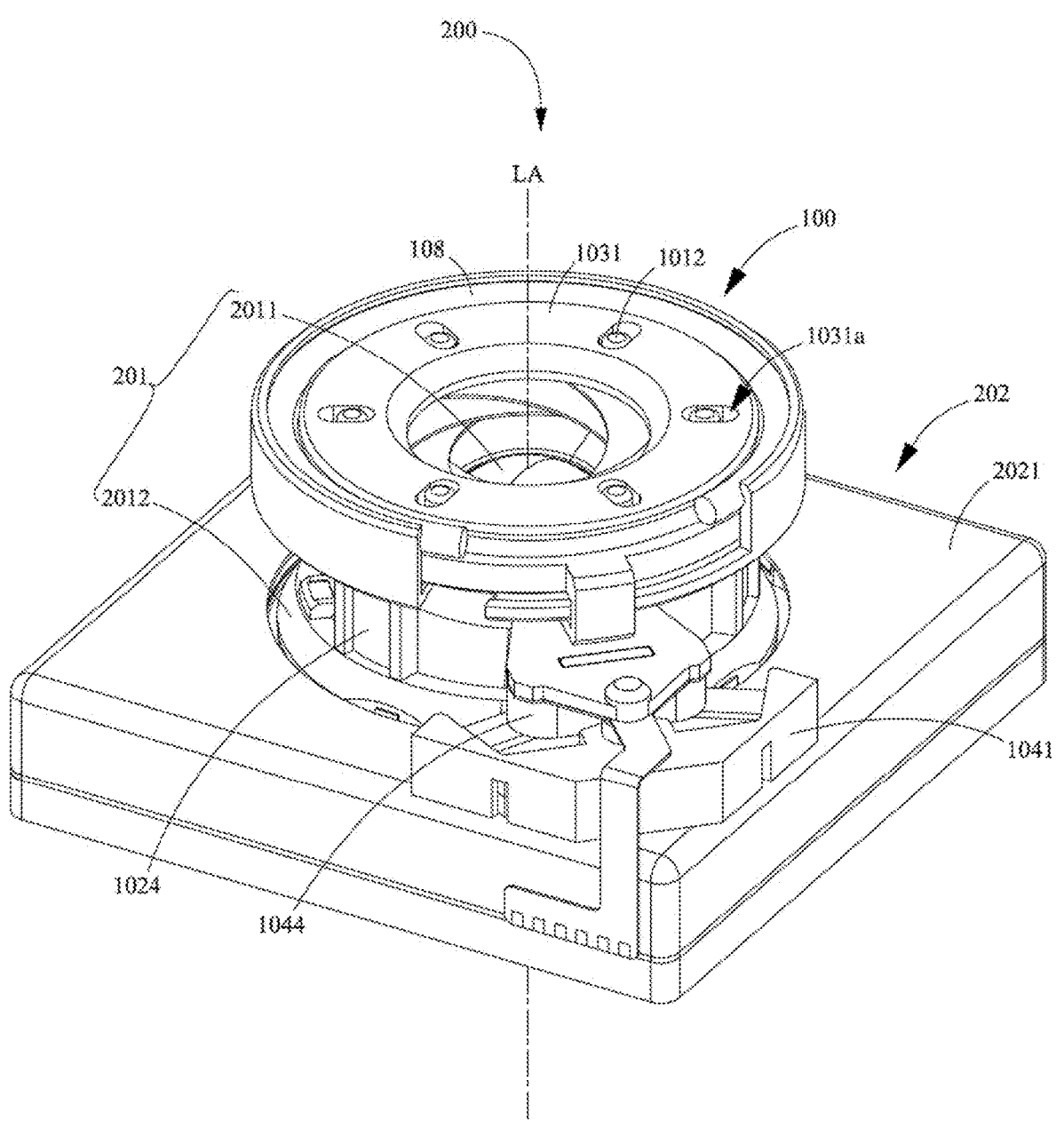
FIG. 25 is a schematic diagram illustrating a three-dimensional structure of a camera module according to a fifth embodiment of the present disclosure.
Figure 26:
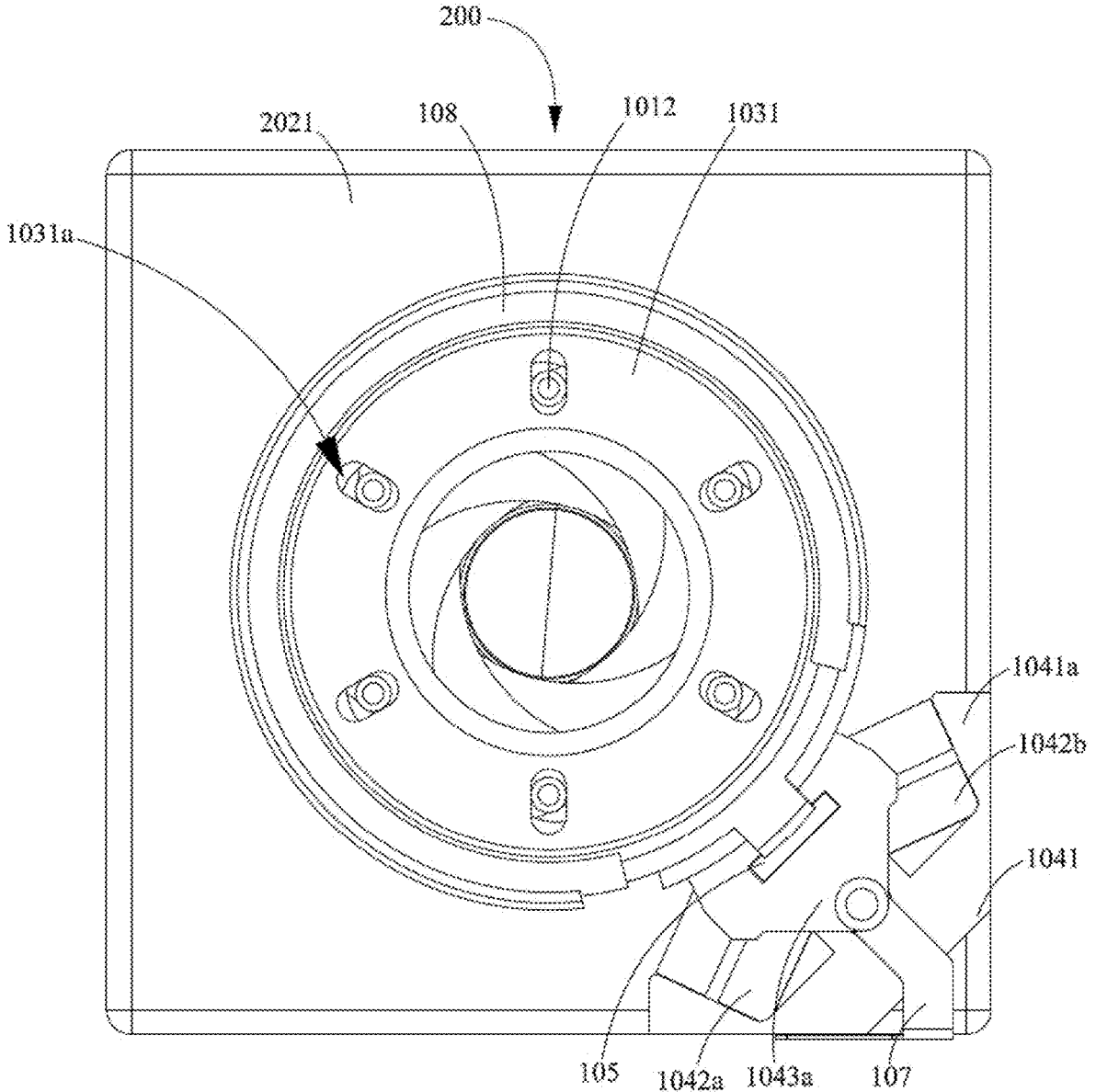
FIG. 26 is a schematic diagram illustrating a front view of the camera module shown in FIG. 25.
Figure 27:
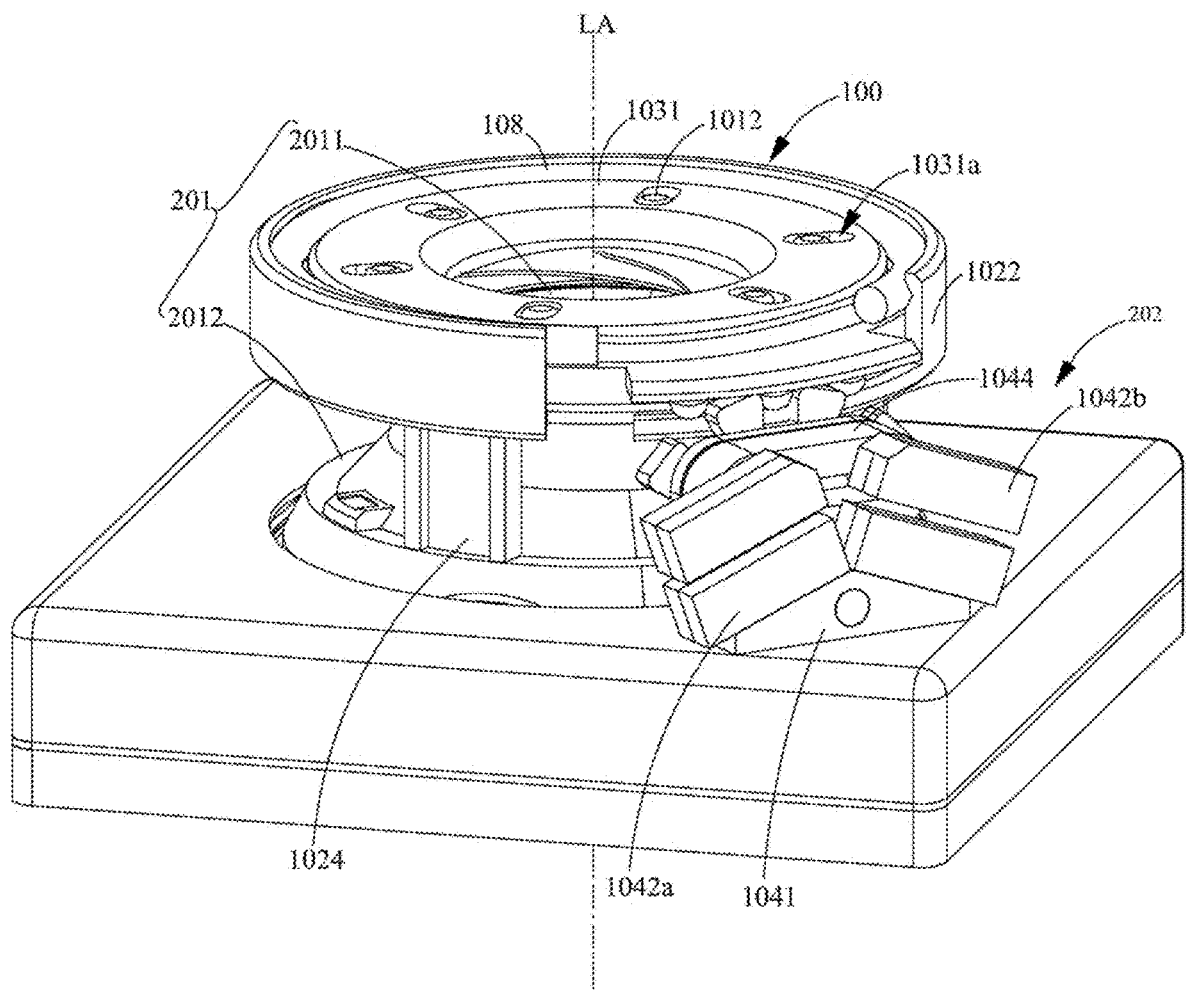
FIG. 27 is a schematic diagram illustrating a three-dimensional structure of another camera module according to the fifth embodiment of the present disclosure.

A fifth embodiment of the present disclosure provides a camera module 200, including a lens 201, an autofocus mechanism 202, and the adjustable diaphragm 100 according to any of the foregoing embodiments. The autofocus mechanism 202 includes a housing 2021 accommodating the lens 201, the adjustable diaphragm 100 is fixed on the housing 2021, and a blade supporting ring 102 of the adjustable diaphragm 100 is located on an object side of the lens 201. An optical axis LA of the camera module 200 coincides with an axis of a supporting ring portion 1021 and an axis of a driving ring portion 1031. FIG. 25 and FIG. 26 are schematic diagrams of the camera module having the adjustable diaphragm 100 according to the foregoing first embodiment, and FIG. 27 is a schematic diagram of the camera module 200 having the adjustable diaphragm 100 according to the foregoing second embodiment.

Specifically, the lens 201 includes a lens set 2011 and a lens shell 2012, the lens set 2011 is accommodated in the lens shell 2012, and a plurality of supporting legs 1024 abut against the lens shell 2012.

In this embodiment, the camera module may further include an anti-shake mechanism (not shown in the figure), arranged on an image side of the housing 2021, and the anti-shake mechanism may implement shake correction by driving a sensor (not shown in the figure) of the camera module to move.

Figure 28:
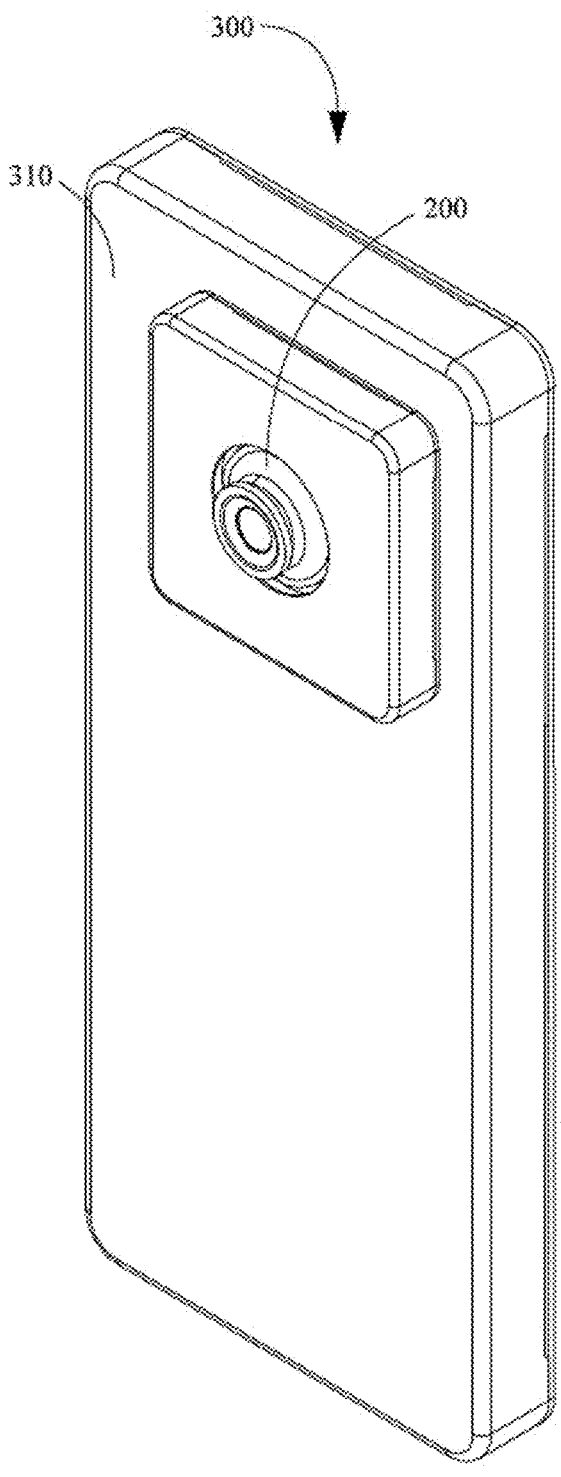
FIG. 28 is a schematic diagram illustrating a three-dimensional structure of an electronic device according to a sixth embodiment of the present disclosure.

A sixth embodiment of the present disclosure provides an electronic device 300. As shown in FIG. 28, the electronic device 300 includes a device body 301 and the camera module 200 according to the fifth embodiment, and the camera module 200 is arranged on the device body 301.

In this embodiment, the electronic device 300 may be a smart phone, a tablet computer, smart watch, a camera, or other electronic devices carrying the camera module provided in the present disclosure. This is not specifically limited in the present disclosure.

The adjustable diaphragm, the camera module, and the electronic device provided in the embodiments of the present disclosure are described in detail above. The principle and implementations of the present disclosure are described herein through specific examples. The description about the foregoing implementations is merely provided to help understand the concept of the present disclosure. Modifications are made in terms of the specific implementations and application scopes. In conclusion, the content of this specification shall not be construed as a limit to the present disclosure.

What is claimed is:

1. An adjustable diaphragm, applied to a camera module, comprising:
   at least one light-shielding blade;
   a blade supporting ring, wherein the at least one light-shielding blade is rotatably fixed on the blade supporting ring;
   a blade driving ring, coaxial with the blade supporting ring and fixed on an object side of the blade supporting ring, wherein the blade driving ring is rotatable relative to the blade supporting ring, and the at least one light-shielding blade is slidably connected to the blade driving ring; and
   an electromagnetic driving assembly, including a base, a driving magnet, a driving rod and a driving coil, wherein the driving magnet is fixed on the base, the driving rod is rotatably fixed on the base, the driving coil is fixed on the driving rod and is arranged relative to the driving magnet, and the driving rod is movably connected to the blade driving ring; and
   wherein the driving magnet drives, in response to the driving coil being energized, the driving coil to drive the driving rod to rotate, and the driving rod drives the blade driving ring to rotate to drive the at least one light-shielding blade to block or expose a lens of the camera module;
   wherein the driving magnet includes a first sub-magnet and a second sub-magnet;
   wherein the first sub-magnet and the second sub-magnet are arranged at an angular interval, and polarities of magnetic poles that are of the first sub-magnet and the second sub-magnet and are adjacent to the blade supporting ring are different; and
   wherein the driving coil, when energized, is subjected to force in a same direction in a magnetic field of the first sub-magnet and a magnetic field of the second sub-magnet to drive the driving rod to rotate.

2. The adjustable diaphragm according to claim 1, wherein the driving rod includes a mounting portion and two driving arms fixedly connected to the mounting portion;
   the mounting portion is rotatably fixed on the base, and the driving coil is fixed on the mounting portion;
   the two driving arms are arranged at intervals and form a driving slot; and
   the blade driving ring includes a driving ring portion and a driving shaft fixedly connected to the driving ring portion, and the driving shaft slidably extends into the driving slot.

3. The adjustable diaphragm according to claim 2, further comprising a position detection element, arranged on the mounting portion, wherein the position detection element detects a rotation angle of the blade driving ring by detecting a relative position of the driving magnet.

4. The adjustable diaphragm according to claim 3, further comprising a flexible printed circuit, fixed on the mounting portion and located between the mounting portion and the driving coil, wherein the flexible printed circuit is electrically connected to the driving coil and the position detection element.

5. The adjustable diaphragm according to claim 2, wherein the blade supporting ring includes a supporting ring portion and a side wall extending from the supporting ring portion to the blade driving ring, wherein the side wall extends along a circumferential direction of the supporting ring portion;
   the side wall has a circular arc-shaped notch; and
   the driving ring includes a driving ring portion and a driving shaft fixedly connected to the driving ring portion, the driving ring portion is accommodated in a space enclosed by the side wall and is arranged relative to the supporting ring portion, and the driving shaft extends to a periphery of the side wall through the circular arc-shaped notch and is bent and extends toward the two driving arms.

6. The adjustable diaphragm according to claim 5, further comprising an arc-shaped positioning member, arranged in the space enclosed by the side wall and located on a side of the driving ring portion facing away from the supporting ring portion, wherein the arc-shaped positioning member is configured to fix the driving ring portion in an axial direction of the driving ring portion.

7. The adjustable diaphragm according to claim 6, wherein a positioning slot extending circumferentially is provided on an inner wall surface of the side wall, and the arc-shaped positioning member is partially embedded in the positioning slot.

8. The adjustable diaphragm according to claim 2, further comprising a closed magnet yoke, arranged on the mounting portion and configured to form a closed magnetic field with the driving magnet.

9. The adjustable diaphragm according to claim 2, wherein side walls that are of the two driving arms and are opposite to each other are both arranged as circular arc side walls protruding outward, and the driving shaft is cylindrical.

10. A camera module, comprising a lens, an autofocus mechanism, and an adjustable diaphragm;
   wherein the adjustable diaphragm includes:
   at least one light-shielding blade;
   a blade supporting ring, wherein the at least one light-shielding blade is rotatably fixed on the blade supporting ring;
   a blade driving ring, coaxial with the blade supporting ring and fixed on an object side of the blade supporting ring, wherein the blade driving ring is rotatable relative to the blade supporting ring, and the at least one light-shielding blade is slidably connected to the blade driving ring; and
   an electromagnetic driving assembly, including a base, a driving magnet, a driving rod and a driving coil, wherein the driving magnet is fixed on the base, the driving rod is rotatably fixed on the base, the driving coil is fixed on the driving rod and is arranged relative to the driving magnet, and the driving rod is movably connected to the blade driving ring; and
   wherein the driving magnet drives, in response to the driving coil being energized, the driving coil to drive the driving rod to rotate, and the driving rod drives the blade driving ring to rotate to drive the at least one light-shielding blade to block or expose a lens of the camera module;
   the autofocus mechanism includes a housing accommodating the lens, the adjustable diaphragm is fixed on the housing, and the blade supporting ring of the adjustable diaphragm is located on an object side of the lens.

11. The camera module according to claim 10, wherein the driving magnet includes a first sub-magnet and a second sub-magnet;
   wherein the first sub-magnet and the second sub-magnet are arranged at an angular interval, and polarities of magnetic poles that are of the first sub-magnet and the second sub-magnet and are adjacent to the blade supporting ring are different; and
   wherein the driving coil, when energized, is subjected to force in a same direction in a magnetic field of the first sub-magnet and a magnetic field of the second sub-magnet to drive the driving rod to rotate.

12. The camera module according to claim 10, wherein the driving rod includes a mounting portion and two driving arms fixedly connected to the mounting portion;

the mounting portion is rotatably fixed on the base, and the driving coil is fixed on the mounting portion;
   the two driving arms are arranged at intervals and form a driving slot; and
   the blade driving ring includes a driving ring portion and a driving shaft fixedly connected to the driving ring portion, and the driving shaft slidably extends into the driving slot.

13. The camera module according to claim 12, the adjustable diaphragm further includes a position detection element, arranged on the mounting portion, wherein the position detection element detects a rotation angle of the blade driving ring by detecting a relative position of the driving magnet.

14. The camera module according to claim 13, the adjustable diaphragm further includes a flexible printed circuit, fixed on the mounting portion and located between the mounting portion and the driving coil, wherein the flexible printed circuit is electrically connected to the driving coil and the position detection element.

15. The camera module according to claim 12, wherein the blade supporting ring includes a supporting ring portion and a side wall extending from the supporting ring portion to the blade driving ring, wherein the side wall extends along a circumferential direction of the supporting ring portion;
   the side wall has a circular arc-shaped notch; and
   the driving ring includes a driving ring portion and a driving shaft fixedly connected to the driving ring portion, the driving ring portion is accommodated in a space enclosed by the side wall and is arranged relative to the supporting ring portion, and the driving shaft extends to a periphery of the side wall through the circular arc-shaped notch and is bent and extends toward the two driving arms.

16. The camera module according to claim 15, the adjustable diaphragm further includes an arc-shaped positioning member, arranged in the space enclosed by the side wall and located on a side of the driving ring portion facing away from the supporting ring portion, wherein the arc-shaped positioning member is configured to fix the driving ring portion in an axial direction of the driving ring portion.

17. The camera module according to claim 16, wherein a positioning slot extending circumferentially is provided on an inner wall surface of the side wall, and the arc-shaped positioning member is partially embedded in the positioning slot.

18. The camera module according to claim 12, the adjustable diaphragm further includes a closed magnet yoke, arranged on the mounting portion and configured to form a closed magnetic field with the driving magnet.

19. An electronic device, comprising a device body and a camera module, wherein the camera module is arranged on the device body;
   the camera module includes a lens, an autofocus mechanism, and an adjustable diaphragm;
   the adjustable diaphragm includes:
   at least one light-shielding blade;
   a blade supporting ring, wherein the at least one light-shielding blade is rotatably fixed on the blade supporting ring;
   a blade driving ring, coaxial with the blade supporting ring and fixed on an object side of the blade supporting ring, wherein the blade driving ring is rotatable relative to the blade supporting ring, and the at least one light-shielding blade is slidably connected to the blade driving ring; and an electromagnetic driving assembly, including a base, a driving magnet, a driving rod and a driving coil, wherein the driving magnet is fixed on the base, the driving rod is rotatably fixed on the base, the driving coil is fixed on the driving rod and is arranged relative to the driving magnet, and the driving rod is movably connected to the blade driving ring; and wherein the driving magnet drives, in response to the driving coil being energized, the driving coil to drive the driving rod to rotate, and the driving rod drives the blade driving ring to rotate to drive the at least one light-shielding blade to block or expose a lens of the camera module;

the autofocus mechanism includes a housing accommodating the lens, the adjustable diaphragm is fixed on the housing, and the blade supporting ring of the adjustable diaphragm is located on an object side of the lens.

\* \* \* \* \*